(12) United States Patent
Lee et al.

(10) Patent No.: US 8,422,848 B2
(45) Date of Patent: Apr. 16, 2013

(54) STRUCTURE COLOUR OF PHOTONIC CRYSTALS, A METHOD OF MANUFACTURING THEREOF AND A MANUFACTURING APPARATUS THEREOF

(75) Inventors: Kyung Wook Lee, Ansan-si (KR); Kyung Yul Lee, Bucheon-si (KR); Bong Yul Lee, Gunpo-si (KR); Wayne H. Choe, Champaign, IL (US)

(73) Assignee: Emot Co., Ltd, Ansan-si, Gyeonggi-do (KR)

( * ) Notice: Subject to any disclaimer, the term of this patent is extended or adjusted under 35 U.S.C. 154(b) by 298 days.

(21) Appl. No.: 12/864,031

(22) PCT Filed: Jul. 9, 2008

(86) PCT No.: PCT/KR2008/004054
§ 371 (c)(1),
(2), (4) Date: Jul. 22, 2010

(87) PCT Pub. No.: WO2009/096640
PCT Pub. Date: Aug. 6, 2009

(65) Prior Publication Data
US 2010/0296787 A1 Nov. 25, 2010

(30) Foreign Application Priority Data
Jan. 29, 2008 (KR) .......... 10-2008-0009148

(51) Int. Cl.
*G02B 6/00* (2006.01)
(52) U.S. Cl.
USPC .......... 385/147; 385/129; 427/162; 216/24

(58) Field of Classification Search .......... 385/147, 385/129; 136/256; 427/162; 216/24
See application file for complete search history.

(56) References Cited

U.S. PATENT DOCUMENTS

| | | | |
|---|---|---|---|
| 7,151,629 B2 | 12/2006 | Takagi et al. | |
| 7,274,849 B2 | 9/2007 | Nobayashi et al. | |
| 2002/0041749 A1* | 4/2002 | Johnson et al. | 385/129 |
| 2012/0153260 A1* | 6/2012 | Kim et al. | 257/14 |

OTHER PUBLICATIONS

Rebecca E. Coath, Investigating the Use of Replica Morpho Butterfly Scales for Colour Displays, University of Southampton, School of Electronics and Computer Science, May 2007.

* cited by examiner

*Primary Examiner* — Ellen Kim
(74) *Attorney, Agent, or Firm* — Sherr & Jiang, PLLC

(57) ABSTRACT

Provided are a structure color of photonic crystals in which a new structure of a structure color of photonic crystals is provided so that a nanoimprint process can be performed and mass productivity is improved, a method of manufacturing thereof, and a manufacturing apparatus thereof. The method of manufacturing a structure color of photonic crystals includes: forming a plurality of basic element layers by using nanoimprinting, the plurality of basic element layers comprising a plurality of basic unit bodies each having a symmetrical cross-section and thin film connecting portions connecting the basic unit bodies! sequentially stacking the basic element layers! removing the thin film connecting portions by using etching; and determining whether the structure color of photonic crystals is completed, wherein, when it is determined that the structure color of photonic crystals is not completed, the forming, the stacking, and the removing are repeatedly performed.

25 Claims, 18 Drawing Sheets

STRUCTURE COLOUR OF PHOTONIC CRYSTALS, A METHOD OF MANUFACTURING THEREOF AND A MANUFACTURING APPARATUS THEREOF

CROSS REFERENCE TO PRIOR APPLICATIONS

This application is a National Stage Patent Application of International Patent Application No. PCT/KR2008/004054 (filed on Jul. 9, 2008) under 35 U.S.C. §371, which claims priority to Korean Patent Application No. 10-2008-0009148 (filed on Jan. 29, 2008), which are both hereby incorporated by reference in their entirety.

TECHNICAL FIELD

The present invention relates to a structure colour of photonic crystals, a method of manufacturing thereof, and a manufacturing apparatus thereof, and more particularly, to a structure colour of photonic crystals having a new structure in which a nanoimprint process can be performed and mass productivity is improved, a method of manufacturing thereof, and a manufacturing apparatus thereof.

BACKGROUND ART

Photonic crystals are periodic optical (nano) structures in which optical mediums or materials having different refractive indexes are alternately arranged with periodicity that is second to the wavelength of light, the photonic crystals having a lattice period that is similar to the wavelength of light.

Such photonic crystals have a structure in which a portion between periodically and regularly-arranged particles is filled with the air. Colour of photonic crystals may be changed by adjusting the wavelength of reflected light by filling other materials instead of the air.

Examples of such photonic crystal structures include Coleoptera and Morpho butterfly.

When Coleoptera is with flaps of the wings in nature, blue colour flashes even in a dark forest. However, there is no colour pigment in the wings of Coleoptera. Blue colour is emitted by reflecting light having a predetermined wavelength and absorbing other lights due to a unique structure of the surface of the wings of Coleoptera. In this way, a phenomenon that colour is generated even without colour pigment is referred to as a structure colour.

FIG. 1 illustrates surface states of conventional photonic structures in which a Morpho butterfly found in South America, tail feathers of a peacock, a raw ore of opal, and the shell of an ormer that exist in the natural world and represent structure colour due to photonic structures, are enlarged by using an electronic microscope.

Blue colour is represented in the wings of the Morpho butterfly when the surface structure of the wings reflects blue light having a predetermined wavelength. The colour of the Morpho butterfly is dark like the body or edges of the wings. Such structure is found even in the feathers of some kinds of birds such as buprestid, wood chat, and peacock. A multilayered photonic crystal structure in which small air bags are regularly stacked in the wings or feathers can be observed by using the electronic microscope. In addition, the surface of leaves of Selaginella which is a fern, has a multilayered photonic crystal structure.

A three dimensional structure of such photonic crystals is used to represent beautiful colours and simultaneously, has a very good characteristic for adjusting the flow of light. Thus, a method of producing the structure in industry is required.

FIG. 2 is a cross-sectional view of a conventional structure colour of photonic crystals that exist in the wings of a Morpho butterfly.

As illustrated in FIG. 2, the conventional structure colour of photonic crystals that exist in the wings of the Morpho butterfly, is a structure in which a plurality of bases 101 that are arranged vertically and a plurality of protrusions 102 that are arranged to be asymmetrical to side surfaces of the bases 101, are formed as one body.

The conventional structure colour of photonic crystals may represent similar colour to that of Morpho butterfly, etc. However, shape structures of the conventional structure colour of photonic crystals and Morpho butterfly are asymmetrical. Thus, it is not easy to use an imprint processing method in the conventional structure colour of photonic crystals, and mass production is not possible.

DISCLOSURE

Technical Problem

The present invention provides a structure colour of photonic crystals in which symmetrical, cross-section-shaped members are stacked so that a nanoimprint process can be performed on the structure colour of photonic crystals and mass production can be easily achieved, and a method of manufacturing thereof.

The present invention also provides a method of manufacturing a structure colour of photonic crystals by which, after thin film connecting portions are formed, basic element layers are stacked to manufacture the structure colour of photonic crystals so that a stacking process can be easily performed and mass production can be achieved.

The present invention also provides a method of manufacturing a structure colour of photonic crystals by which the structure color of photonic crystals is manufactured by using a flat mold and a roller mold so that a structure of colour of photonic crystals can be manufactured in mass production within a short time.

Technical Solution

According to an aspect of the present invention, there is provided a method of manufacturing a structure colour of photonic crystals, the method including: forming a plurality of basic element layers by using nanoimprinting, the plurality of basic element layers comprising a plurality of basic unit bodies each having a symmetrical cross-section and thin film connecting portions connecting the basic unit bodies; sequentially stacking the basic element layers; removing the thin film connecting portions by using etching; and determining whether the structure colour of photonic crystals is completed, wherein, when it is determined that the structure colour of photonic crystals is not completed, the forming of the basic element layers, the stacking of the basic element layers, and the removing of the thin film connecting portions are repeatedly performed.

The forming of the basic element layers may include: aligning lower and upper molds that are formed by intaglio engraving bottom and top surfaces of photonic crystals; inserting a photonic crystal cloning material between the lower and upper molds; pressing the lower and upper molds to form the photonic crystal cloning material; curing the photonic crystal cloning material; and separating the lower and upper molds from each other.

Each of the basic unit bodies may have a "T"-shaped cross-section. The forming of the basic element layers may include:

aligning a first forming roller that is formed by intaglio engraving a first side surface of the photonic crystals and a second forming roller that is formed by intaglio engraving a second side surface of the photonic crystals, in a line; passing a photonic crystal cloning material between the first forming roller and the second forming roller to simultaneously form both sides of the photonic crystal cloning material; and curing the photonic crystal cloning material.

An intaglio engraved shape of the first forming roller may be different from an intaglio engraved shape of the second forming roller so that both sides of the photonic crystal cloning material have different cross-sections. The stacking of the basic element layers may include aligning adjacent basic element layers to cross one another and stacking the basic element layers.

The stacking of the basic element layers may include stacking the basic element layers by changing top and bottom surfaces of a portion of the basic element layers.

The removing of the thin film connecting portions may include removing the thin film connecting portions by using plasma etching.

According to another aspect of the present invention, there is provided a structure colour of photonic crystals in which a plurality of basic element layers that are formed by using nanoimprinting and are sequentially stacked, the plurality of basic element layers comprising a plurality of basic unit bodies each having a "T"-shaped cross-section.

A height of each of the "T"-shaped basic unit bodies may be 0.5~1.5 μm, and a thickness of a horizontal portion of each of the basic unit bodies may be 0.1~0.5 μm, and a thickness of a vertical portion of each of the basic unit bodies may be 0.1~0.3 μm. The basic element layers may be arranged to cross adjacent basic element layers and are stacked.

According to another aspect of the present invention, there is provided a method of manufacturing a structure colour of photonic crystals, the method including: designing and determining the number of layers (n-layer) of the structure colour of photonic crystals; forming a plurality of basic element layers by using nanoimprinting, the plurality of basic element layers comprising a plurality of basic unit bodies each having a symmetrical cross-section and thin film connecting portions connecting the basic unit bodies; sequentially stacking the basic element layers; and removing the thin film connecting portions by using etching, wherein the forming of the basic element layers, the stacking of the basic element layers, and the removing of the thin film connecting portions are repeatedly performed (n−1) times.

According to another aspect of the present invention, there is provided an apparatus for manufacturing a structure colour of photonic crystals, the apparatus including: a lateral basic element layer forming roller portion comprising a first roller having a plurality of radial, symmetrical grooves formed in sides of the first roller, the first roller rotated by a driving portion, a second roller that is positioned to be engaged in a line with the first roller, and a photonic crystal cloning material first supplying portion supplying a photonic crystal cloning material between the first roller and the second roller; and a longitudinal basic element layer forming roller portion comprising a third roller that is formed at one side of the lateral basic element layer forming roller portion and is positioned above the photonic crystal cloning material passing the lateral basic element layers and has a plurality of lengthwise, symmetrical grooves formed insides of the third roller, a fourth roller that is positioned to be engaged in a line with the third roller, and a photonic crystal cloning material second supplying portion supplying a photonic crystal cloning material between the third roller and the fourth roller, wherein the photonic crystal cloning material passing the longitudinal basic element layer forming roller portion is stacked on the photonic crystal cloning material passing the lateral basic element layer forming roller portion.

Each of the grooves of the first roller may have a "T"-shaped cross-section. The lateral basic element layer forming roller portion may further include: a first carrier film supplying portion which is formed above the lateral basic element layer forming roller portion and supplies a carrier film between the first roller and the second roller; and a first carrier film winding portion which winds the carrier film passing between the first roller and the second roller and stores the carrier film, and the longitudinal basic element layer forming roller portion may further include: a second carrier film supplying portion which is formed above the longitudinal basic element layer forming roller portion and supplies a carrier film between the third roller and the fourth roller; and a second carrier film winding portion which winds the carrier film passing between the third roller and the fourth roller and stores the carrier film.

Advantageous Effects

In a structure colour of photonic crystals and a method of manufacturing thereof according to the present invention, a new structure of the structure colour of photonic crystals is provided such that a nanoimprint process can be performed and mass production can be easily achieved.

In addition, after thin film connecting portions are formed, basic element layers are stacked to manufacture a structure colour of photonic crystals such that a stacking process can be more easily performed and productivity of the structure colour of photonic crystals is improved.

BEST MODE

The present invention will now be described more fully with reference to the accompanying drawings, in which exemplary embodiments of the invention are shown. First, terms or words used in the present specification and the claims should not be construed as being limited to general or literal meaning, and the inventor should construe his/her own invention in meaning and concept that coincide with the technical spirit of the invention based on the principle for properly defining the concept of the terms so as to describe his/her own invention in the best manner.

Thus, configurations shown in embodiments and the drawings of the present invention rather is an example of the most exemplary embodiment and does not represent all of the technical spirit of the invention. Thus, it will be understood that various equivalents and modifications that replace the configurations are possible when filing the present application.

Figure 1:
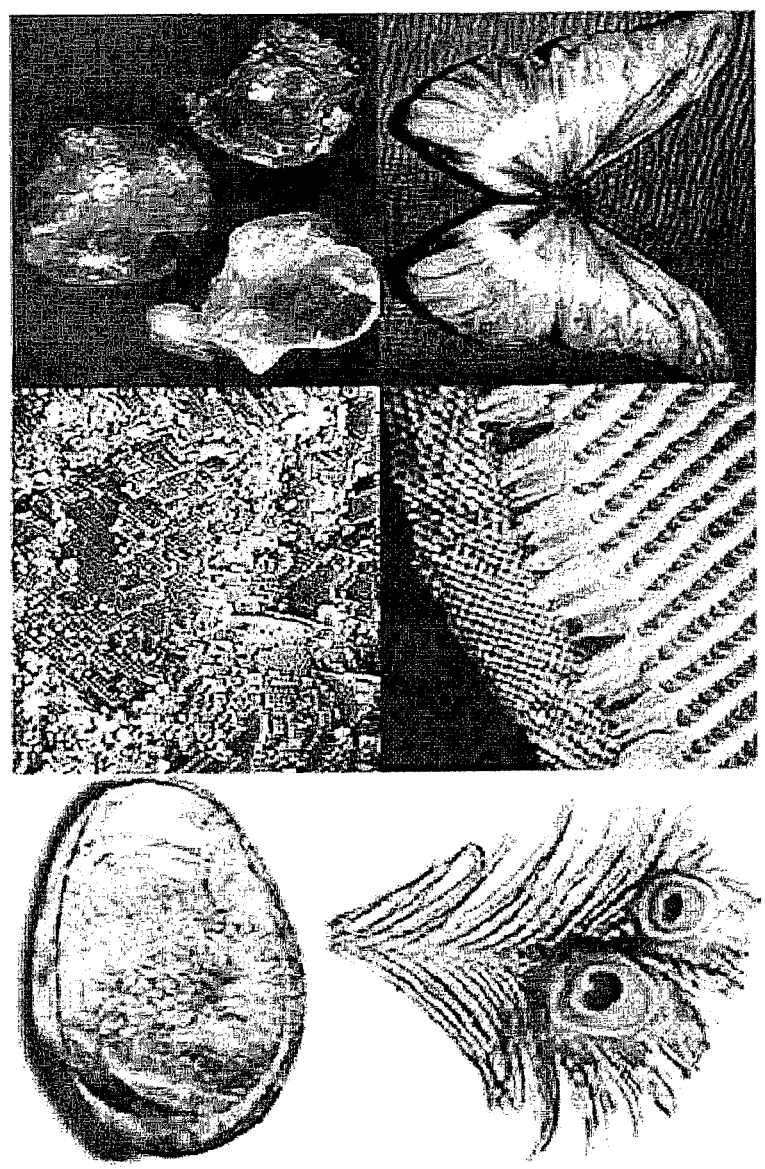
FIG. 1 illustrates structure colours of photonic structures.
Figure 2:
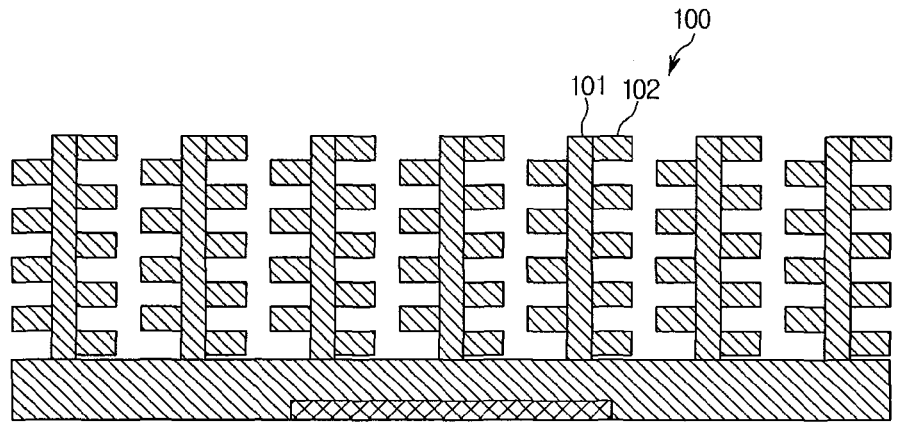
FIG. 2 is a cross-sectional view of a conventional structure colour of photonic crystals that exist in the wings of Morpho butterfly.
Figure 3:
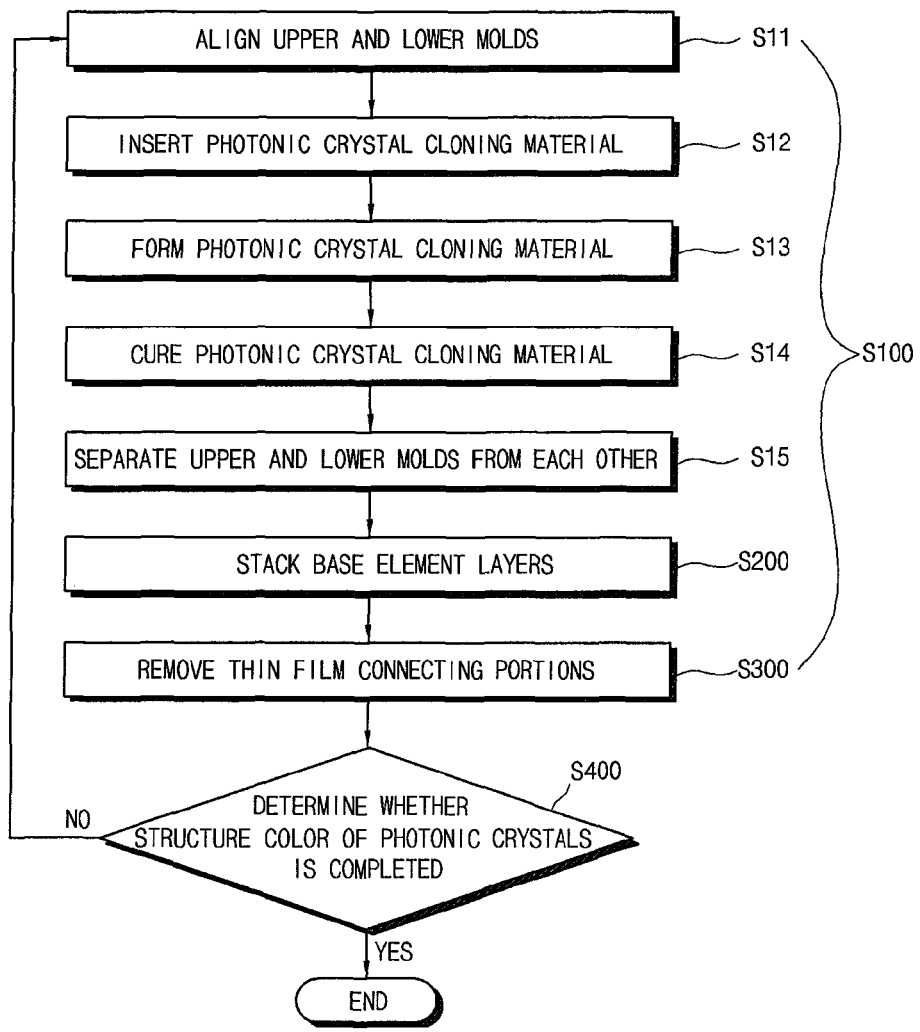
FIG. 3 is a flowchart illustrating a method of manufacturing a structure colour of photonic crystals according to an embodiment of the present invention.
Figure 4:
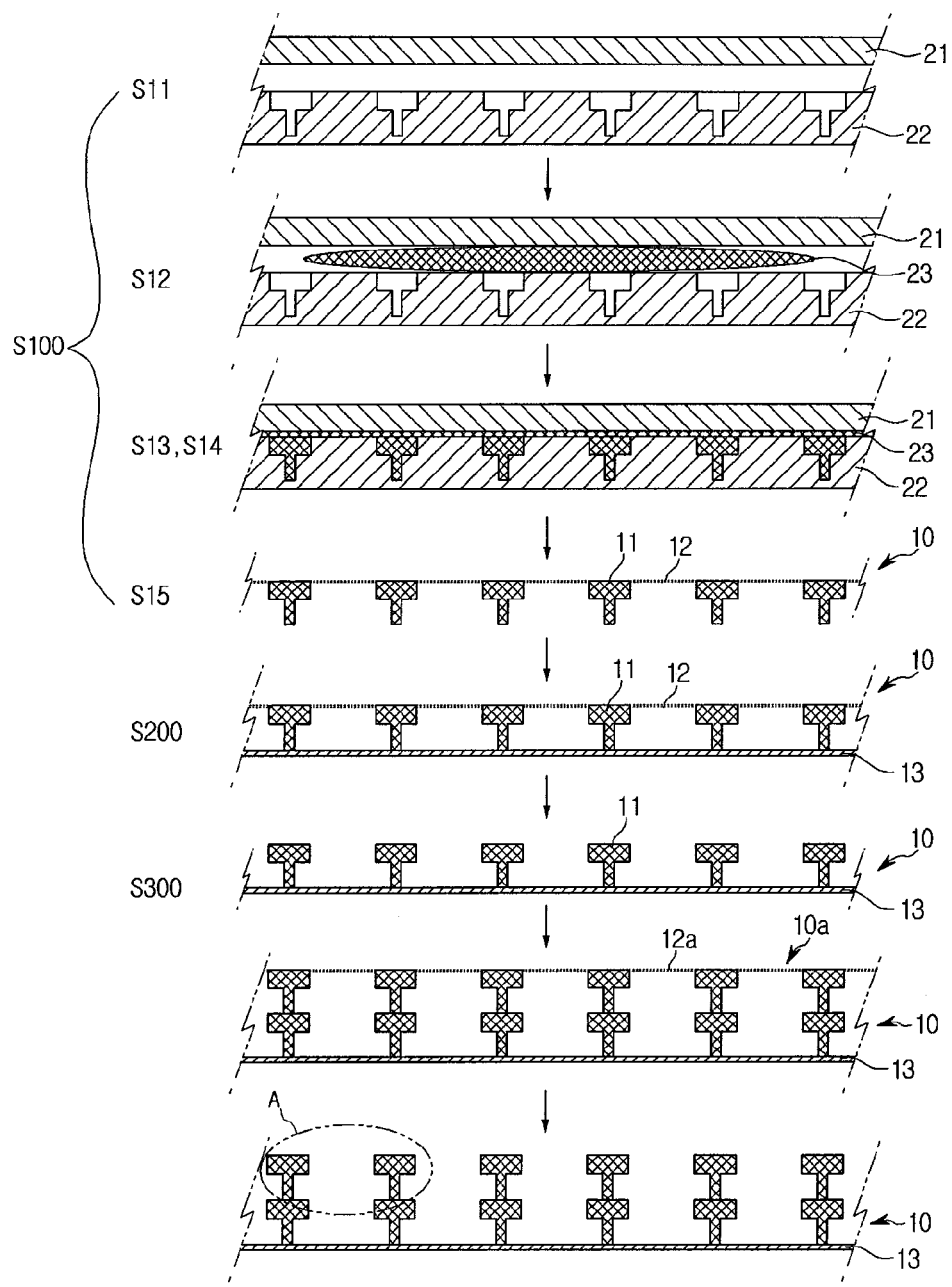
FIG. 4 is a cross-sectional view illustrating each of operations of the method of manufacturing the structure colour of photonic crystals illustrated in FIG. 3.
Figure 5:
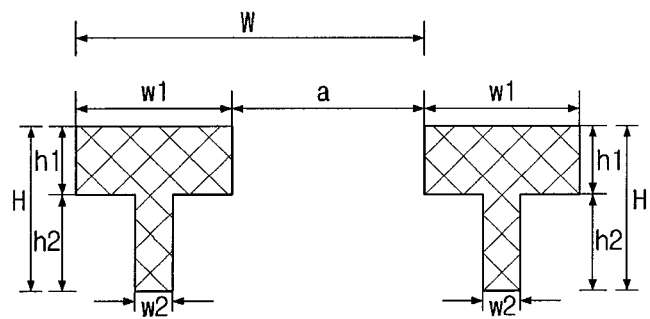
FIG. 5 is an enlarged view of a portion "A" of FIG. 4.
Figure 6:
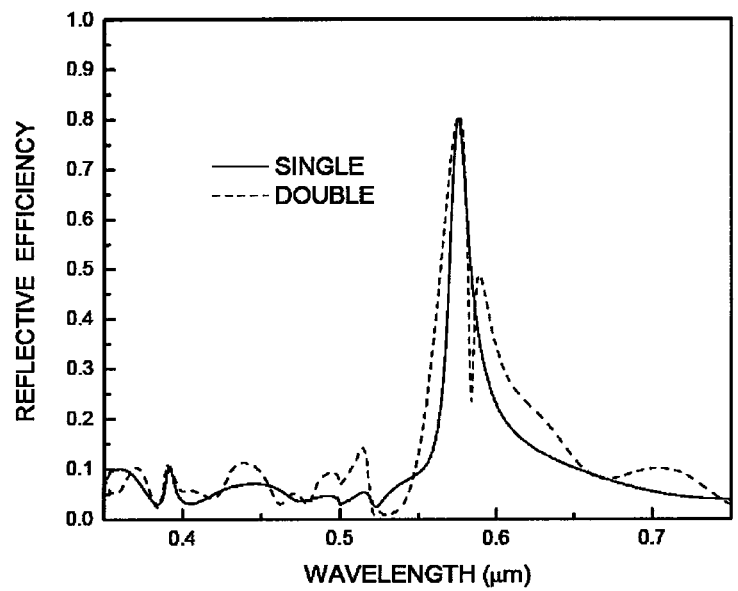
FIG. 6 is a graph showing wavelength (μm) versus reflective efficiency and showing optical characteristic spectrum data of the structure colour of photonic crystals that is formed by the method of manufacturing the structure colour of photonic crystals illustrated in FIG. 3.

FIG. 3 is a flowchart illustrating a method of manufacturing a structure colour of photonic crystals according to an embodiment of the present invention, and FIG. 4 is a cross-sectional view illustrating each of operations of the method of manufacturing the structure colour of photonic crystals illustrated in FIG. 3, and FIG. 5 is an enlarged view of a portion "A" of FIG. 4, and FIG. 6 is a graph showing wavelength (μm) versus reflective efficiency and showing optical characteristic spectrum data of the structure colour of photonic crystals that is formed by the method of manufacturing the structure colour of photonic crystals illustrated in FIG. 3.

As illustrated in FIGS. 3 and 4, the method of manufacturing the structure colour of photonic crystals according to the current embodiment of the present invention comprises forming basic element layers 10 (S100), stacking the basic element layers 10 (S200), removing thin film connecting portions (S300), and determining whether the structure colour of photonic crystals is completed (S400).

The forming of the basic element layers 10 (S100) comprises forming the basic element layers 10 each comprising a plurality of basic unit bodies 11 and a plurality of thin film connecting portions 12.

Each of the basic unit bodies 11 has a symmetrical cross-section. In the current embodiment, each of the basic unit bodies 11 is "T"-shaped.

A height H of each of the "T"-shaped basic unit bodies 11 is 0.5~1.5 μm, a width W thereof is 0.5~1.5 μm, and a height h1 of an upper portion of each of the "T"-shaped basic unit bodies 11 is 0.1~0.5 μm, and a height h2 of a lower portion of each of the "T"-shaped basic unit bodies 11 is 0.5~1.0 μm, and a width w1 of the upper portion is 0.5~1.0 μm, and a width w2 of the lower portion is 0.1~0.3 μm, and a distance 'a' between the basic unit bodies 11 is (0.5~1.0)×w1, and W/H=0.75~1.25, h1/h2=0.5~0.8.

Each of the thin film connecting portions 12 connecting the plurality of basic unit bodies 11 is formed on both ends of each of the basic unit bodies 11, and the basic unit bodies 11 and the thin film connecting portions 12 are formed by using a nanoimprinting method.

The nanoimprinting method comprises aligning upper and lower molds 21 and 22 (S11), inserting a photonic crystal cloning material 23 between the upper and lower molds 21 and 22 (S12), pressing the upper and lower molds 21 and 22 to form the photonic crystal cloning material 23 (S13), curing the photonic crystal cloning material 23 (S14), and separating the upper and lower molds 21 and 22 from each other (S15).

The upper and lower molds 21 and 22 are formed by intaglio engraving bottom and top surfaces of the photonic crystals in the same manner as bottom and top surfaces of the structure colour of photonic crystals.

Each of the upper and lower molds 21 and 22 is formed of silicon (Si), glass, polymer, quartz or metal and is processed by using electron beam (E-beam) lithography, laser machining, photolithography, laser interference lithography or X-ray interference lithography.

The photonic crystal cloning material 23 that is inserted between the upper and lower molds 21 and 22 is formed of a photocurable or thermosetting resin.

After that, the upper and lower molds 21 and 22 are formed by pressing the photonic crystal cloning material 23 at 20-40 bar, and after formation is completed, the photonic crystal cloning material 23 is cured, and the basic element layers 10 are formed (S14).

The photonic crystal cloning material 23 is cured by heating or irradiating ultraviolet (UV) rays. In the current embodiment, UV rays are irradiated for 1-15 minutes or heating is performed at 40-150° C. for 1-10 minutes, thereby promoting curing of the photonic crystal cloning material 23.

When curing of the photonic crystal cloning material 23 is completed, the upper and lower molds 21 and 22 are separated from each other, thereby forming the basic element layers 10 (S15).

The basic element layers 10 that are initially manufactured are stacked on a substrate 13 formed of metal or plastics.

When the stacking process is performed, each of the basic unit bodies 11 is connected by each of the thin film connecting portions 12 so that the basic unit bodies 11 are prevented from being separated from one another and the stacking process can be easily performed.

When the stacking process is performed, an adhesive layer is formed between the basic element layer 10 and the substrate 13 or a contact surface therebetween is fused so that the basic element layer 10 can be attached to the substrate 13.

Next, the thin film connecting portions 12 of the plurality of stacked basic element layers 10 are removed. The thin film connecting portions 12 are removed by using plasma etching.

In the current embodiment, the thin film connecting portions 12 are removed by using plasma etching. However, the thin film connecting portions 12 may be removed by using general chemical etching, reactive ion etching (RIE), etc.

When the removing of the thin film connecting portions 12 (S300) is completed, the forming of the basic element layers 10 (S100) is repeatedly performed to form new basic element layers 10a, and the newly-formed basic element layers 10a are arranged and stacked on the basic element layers 10 that have been already stacked on the substrate 13.

When the new basic element layers 10a are stacked on the top surface of the basic element layers 10, the new basic element layers 10a are aligned by checking a colour and a pattern in which light having a predetermined wavelength is irradiated on the stacked basic element layers 10 and 10a at a predetermined angle and the light is reflected, or the new basic element layers 10a are arranged and stacked on the basic element layers 10 by checking a colour and a pattern in which white light is irradiated on the stacked basic element layers 10 and 10a at a predetermined angle and the white light is reflected. When the basic element layers 10a are stacked, an adhesive layer is formed between the stacked basic element layers 10 and the newly-stacked basic element layers 10a, or a contact surface therebetween is fused so that the adjacent basic element layers 10 and 10a can be combined with each other.

Next, a plurality of thin film connecting portions 12a of the basic element layers 10a that are positioned in the uppermost position are removed by using plasma etching.

When the thin film connecting portions 12a are removed, it is determined whether the structure colour of photonic crystals is completed (S400), and the forming of the basic element layers 10 (S100), the stacking of the basic element layers 10 (S200), and the removing of the thin film connecting portions 12 (S300) are repeatedly performed until the structure colour of photonic crystals is completed.

FIG. 6 is a graph showing wavelength (μm) versus reflective efficiency and showing optical characteristic spectrum data of the structure colour of photonic crystals that is formed by the method of manufacturing the structure colour of photonic crystals illustrated in FIG. 3. FIG. 6 illustrates the result of reflection in case when each of basic unit bodies has the size of w1=1.0 μm, H=1.0 μm, and w2=0.2 μm and a distance 'a' between the basic unit bodies is 0.4 μm.

"Single" of the graph of FIG. 6 indicates the case where only a layer is stacked, and "Double" of the graph of FIG. 6 indicates the case where two layers are stacked. In both cases, a reflective characteristic is shown at a predetermined wavelength (green yellow colour having a wavelength of approximately 0.58 μm).

Figure 7:
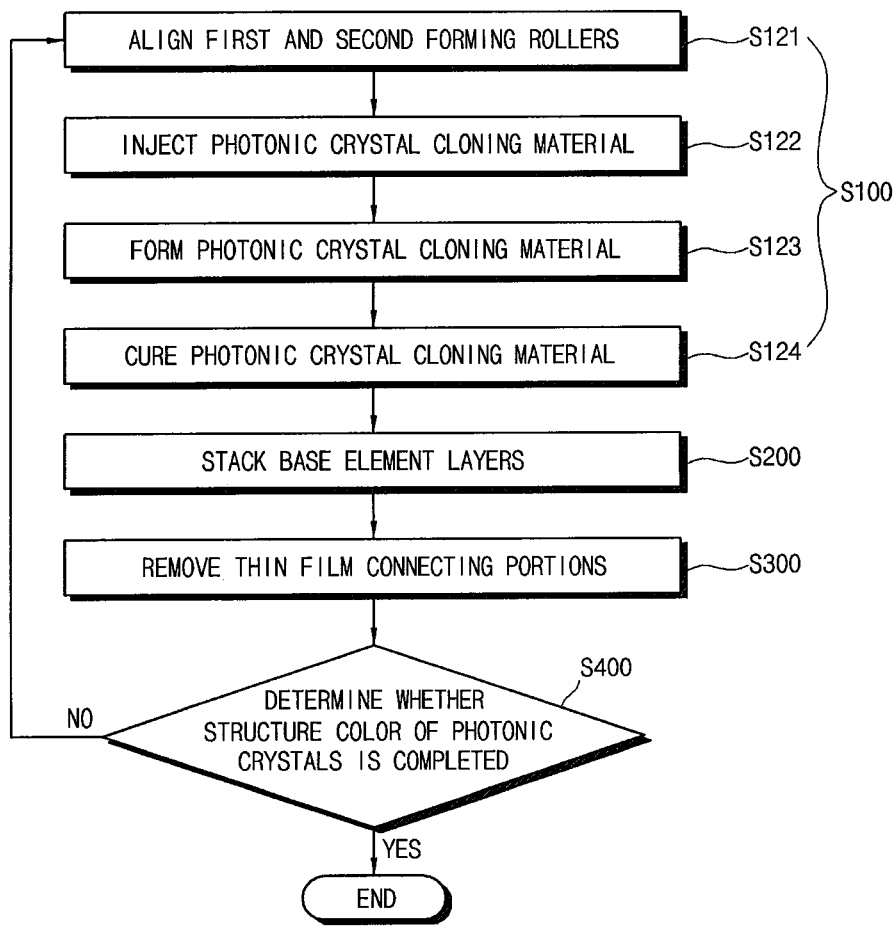
FIG. 7 is a flowchart illustrating a method of manufacturing a structure colour of photonic crystals according to another embodiment of the present invention.
Figure 8:
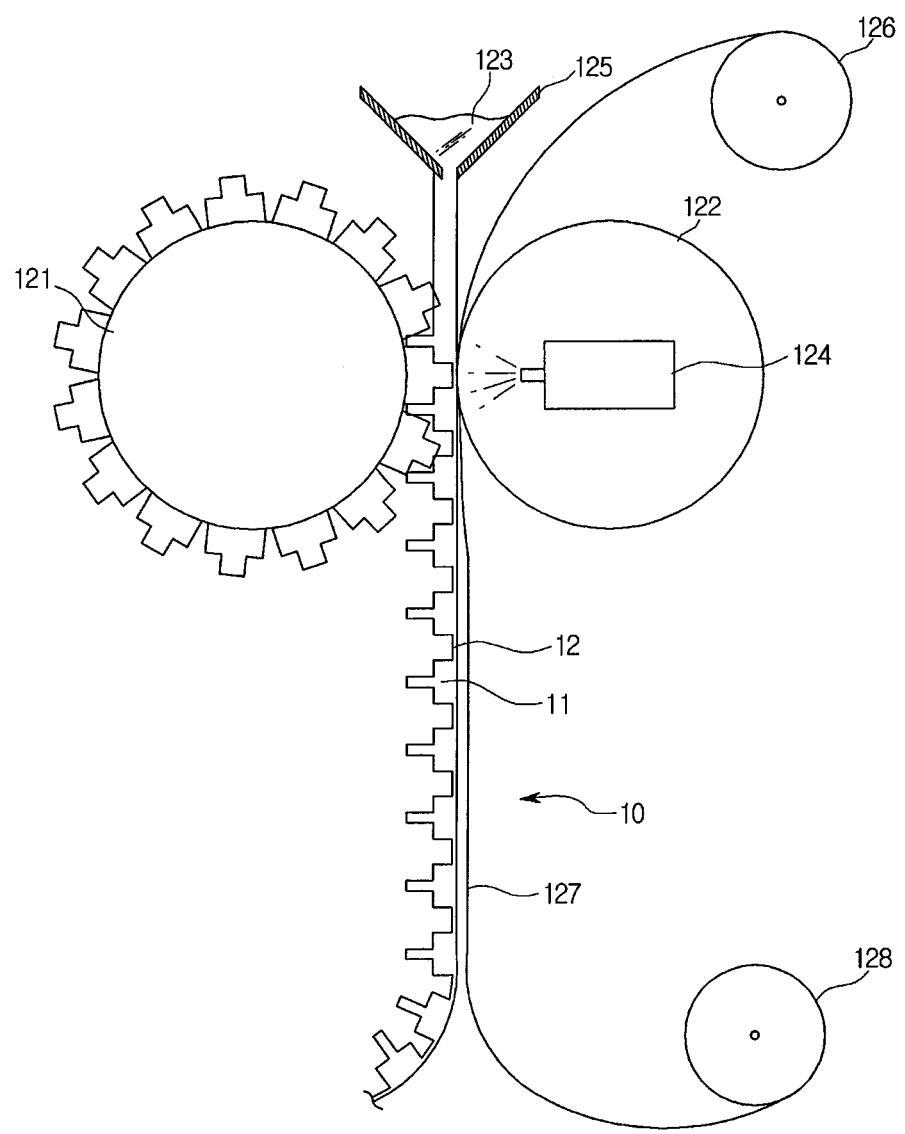
FIG. 8 is a cross-sectional view of an apparatus for manufacturing the basic element layers illustrated in FIG. 7.

FIG. 7 is a flowchart illustrating a method of manufacturing a structure colour of photonic crystals according to another embodiment of the present invention, and FIG. 8 is a cross-sectional view of an apparatus for forming the basic element layers illustrated in FIG. 7.

The current embodiment of FIG. 7 is characterized by a different operation of forming the basic element layers from that of FIG. 3. Thus, the same operations as those of FIG. 3 will be omitted and the operation of forming the basic element layers will now be described in details.

As illustrated in FIGS. 7 and 8, the operation of forming the basic element layers (S100) of the method of manufacturing the structure colour of photonic crystals of FIG. 7 comprises aligning first and second forming rollers 121 and 122 in a line (S121), injecting a photonic crystal cloning material 123 between the first and second forming rollers 121 and 122, forming the photonic crystal cloning material 123 (S123), curing the formed photonic crystal cloning material 123 (S124).

An outer circumferential edge of the first forming roller 121 is intaglio engraved in the same manner as a first side surface of a final structure colour of photonic crystals, and an outer circumferential edge of the second forming roller 122 is formed in the same manner as a second side surface of the final structure colour of photonic crystals.

In the structure colour of photonic crystals that is generated in FIG. 7, "T"-shaped basic unit bodies are consecutively formed. The outer circumferential edge of the first forming roller 121 is formed in a rectangular gear shape at regular intervals, and the outer circumferential edge of the second forming roller 122 is flat.

After the first and second forming rollers 121 and 122 are aligned, the photonic crystal cloning material 123 formed of UV polymer is injected between the first and second forming rollers 121 and 122 by using a hopper 125. The photonic crystal cloning material 123 passes between the first and second forming rollers 121 and 122 and is pressed and both side surfaces of the photonic crystal cloning material 123 are formed simultaneously so that the photonic crystal cloning material 123 is formed in the shape in which "T"-shapes are consecutively formed.

The photonic crystal cloning material 123 that is formed by the first and second forming rollers 121 and 122 is cured by an exposure device 124 installed in the second forming roller 122. The photonic crystal cloning material 123 is used to form the basic element layers 10. In the current embodiment, the exposure device 124 is an UV lamp that cures the photonic crystal cloning material 123, and the second forming roller 122 is formed of a transparent material so that UV light emitted by the UV lamp can be effectively irradiated on the photonic crystal cloning material 123.

Meanwhile, a carrier film supplying unit 126 is formed above the first and second forming rollers 121 and 122. The carrier film supplying unit 126 supplies a carrier film 127 to one side of the photonic crystal cloning material 123 that is supplied between the first and second forming rollers 121 and 122.

The carrier film 127 is conveyed while being combined with the side of the photonic crystal cloning material 123 so that the photonic crystal cloning material 123 can be more stably conveyed.

A carrier film winding roller 128 that separates the carrier film 127 passing between the first and second forming rollers 121 and 122 from the photonic crystal cloning material 123 and winds the carrier film 127, is installed below the first and second forming rollers 121 and 122.

The current embodiment of FIG. 7 has an advantage that basic element layers are consecutively manufactured by using an imprinting method using a roller and a large amount of photonic crystal cloning material can be formed within a short time.

Figure 9:
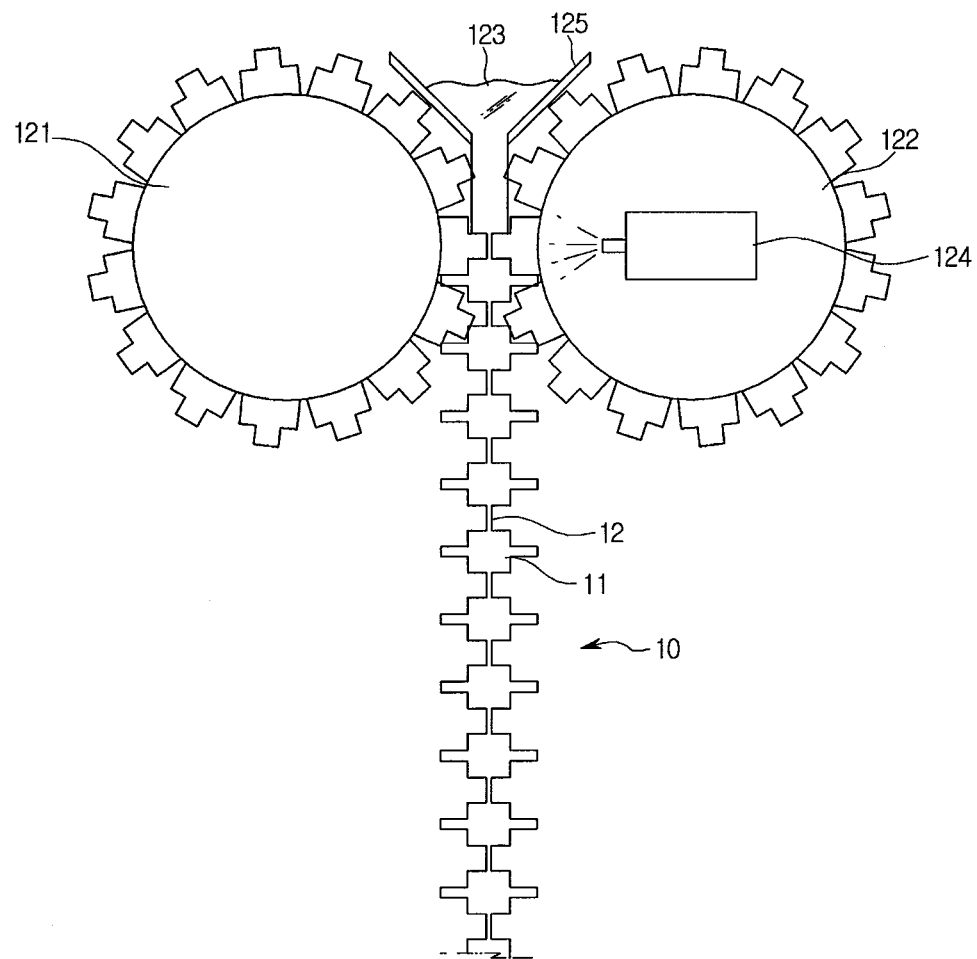
FIG. 9 is a cross-sectional view of an apparatus for manufacturing basic element layers of a structure colour of photonic crystals according to another embodiment of the present invention.
Figure 10:
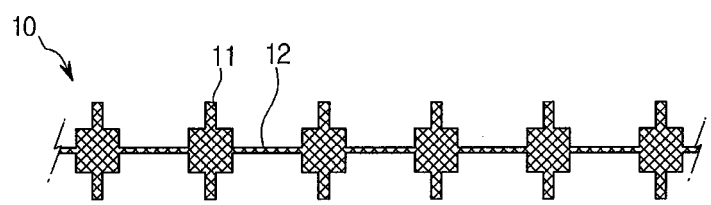
FIG. 10 is a cross-sectional view of the basic element layers of FIG. 9.

FIG. 9 is a cross-sectional view of an apparatus for forming basic element layers of a structure colour of photonic crystals according to another embodiment of the present invention, and FIG. 10 is a cross-sectional view of the basic element layers of FIG. 9.

As illustrated in FIGS. 9 and 10, in the current embodiment, the outer circumferential edge of the second forming roller 122 is intaglio engraved, thereby generating the basic element layers 10 in which both sides of the photonic crystal cloning material 123 are simultaneously processed and which have various shapes at their both sides.

According to the current embodiment of FIG. 9, both sides of the photonic crystal cloning material 123 are simultaneously processed by using the first and second forming rollers 121 and 122 so that the basic element layers 10 can have various shapes and a production time is reduced.

Figure 11:
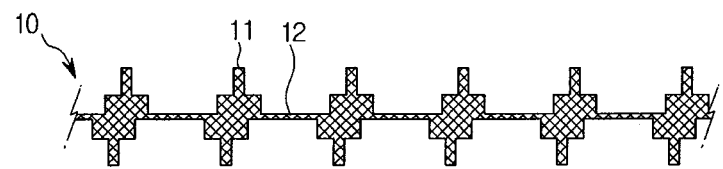
FIG. 11 is a cross-sectional view of basic element layers according to another embodiment of the present invention.

FIG. 11 is a cross-sectional view of basic element layers according to another embodiment of the present invention.

In the current embodiment of FIG. 11, pitches of a rectangular gear shape that is engraved on the first forming roller 121 and the second forming roller 122, are differently formed and both sides of the photonic crystal cloning material 123 are differently processed so that basic element layers having different both-side shapes can be formed.

The basic element layers of FIG. 11 have different pitches of their both sides so that the basic element layers can have unique optical characteristics and a difference between pitches of both sides of the basic element layers is adjusted and optical characteristics can be changed.

Figure 12:
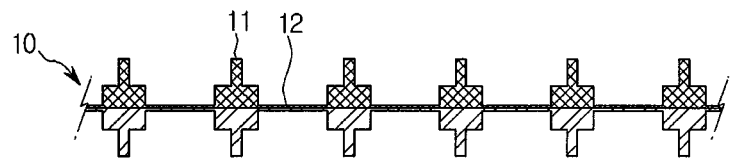
FIG. 12 is a cross-sectional view of basic element layers according to another embodiment of the present invention.

FIG. 12 is a cross-sectional view of basic element layers according to another embodiment of the present invention.

In the current embodiment of FIG. 12, the basic element layers 10 are formed by injecting two kinds of photonic crystal cloning materials 123 between the first forming roller 121 and the second forming roller 122.

The basic element layers 10 are formed by inserting the photonic crystal cloning material 123 having two, different materials between the first forming roller 121 and the second forming roller 122.

The basic element layers 10 of FIG. 12 comprise layers formed of two, different materials, thereby implementing various optical characteristics.

Figure 13:
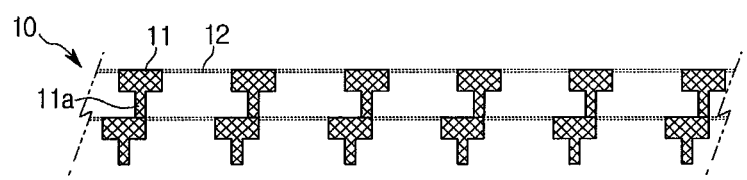
FIG. 13 is a cross-sectional view of a structure colour of photonic crystals according to another embodiment of the present invention.

FIG. 13 is a cross-sectional view of a structure colour of photonic crystals according to another embodiment of the present invention.

As illustrated in FIG. 13, the structure colour of photonic crystals according to the current embodiment of the present invention is a structure colour of photonic crystals in which vertical portions 11a of "T"-shaped basic unit bodies are not arranged on the same line as adjacent basic element layers but are arranged laterally to cross one another and the basic element layers 10 are stacked.

In the current embodiment of FIG. 13, the vertical portions 11a of the basic unit bodies of the adjacent basic element layers 10 are arranged to cross one another so that the structure colour of photonic crystals has an optical representation characteristic in a predetermined direction.

Figure 14:
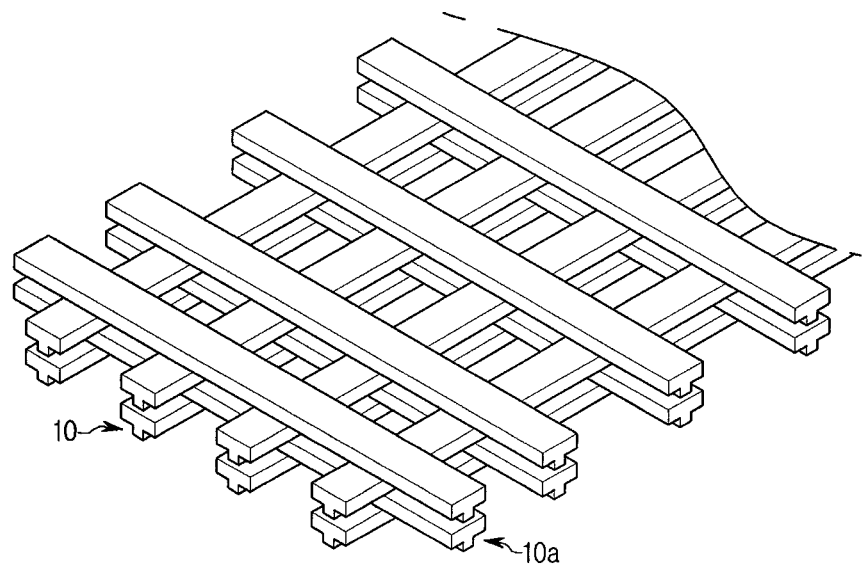
FIG. 14 is a perspective view of a structure colour of photonic crystals according to another embodiment of the present invention.

FIG. 14 is a perspective view of a structure colour of photonic crystals according to another embodiment of the present invention.

As illustrated in FIG. 14, in the structure colour of photonic crystals according to the current embodiment of the present invention, basic element layers that are formed by the method of manufacturing the structure colour of photonic crystals of FIG. 3 are stacked perpendicular thereto.

In other words, in the structure colour of photonic crystals of FIG. 14, next basic element layers 10a cross the adjacent "T"-shaped basic element layers 10 perpendicular thereto. In the current embodiment, four layers are stacked.

In the method of manufacturing the structure colour of photonic crystals of FIG. 14 by which the next basic element layers 10a cross the adjacent basic element layers 10 perpendicular thereto, the photonic crystal cloning material is aligned by checking a colour and a pattern in which light having a predetermined wavelength is irradiated on the photonic crystal cloning material and the light is reflected during a stacking operation, or a process of correcting arrangement of the photonic crystal cloning material can be omitted after checking a colour and a pattern in which white light is irradiated on the photonic crystal cloning material at a predetermined angle and the white light is reflected, so that mass productivity is remarkably improved, compared to the method of manufacturing the structure colour of photonic crystals according to another embodiment of the present invention by which the next basic element layers 10a are stacked to be parallel to the adjacent basic element layers 10.

In addition, according to the current embodiment of FIG. 14, a three dimensional structure colour of photonic crystals can be formed without performing an additional process.

Figure 15:
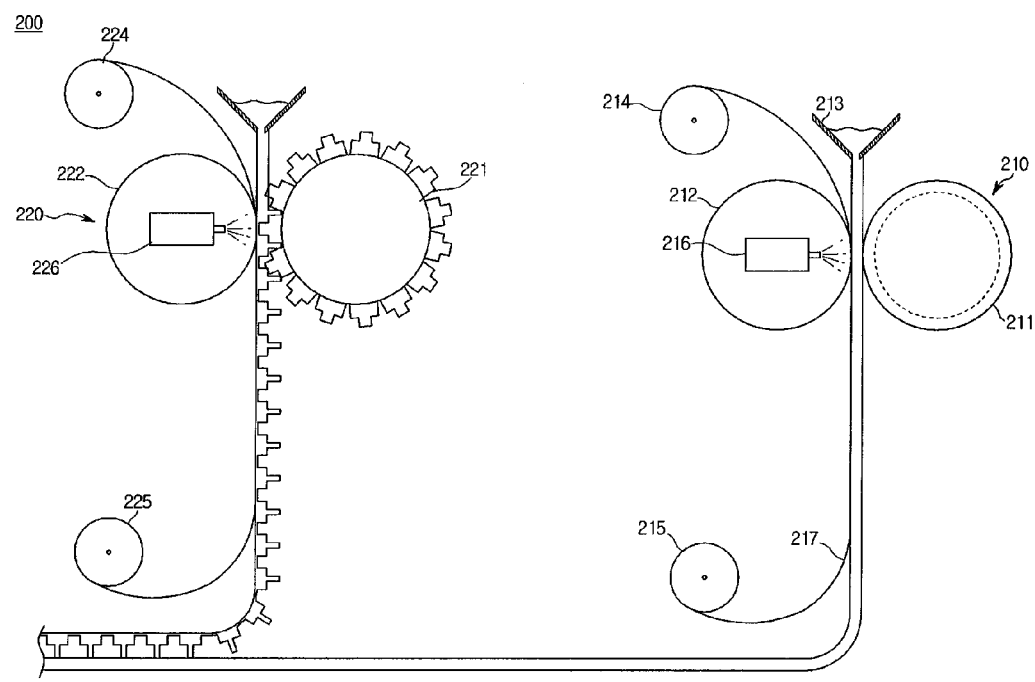
FIG. 15 illustrates an apparatus for manufacturing a structure colour of photonic crystals according to another embodiment of the present invention.
Figure 16:
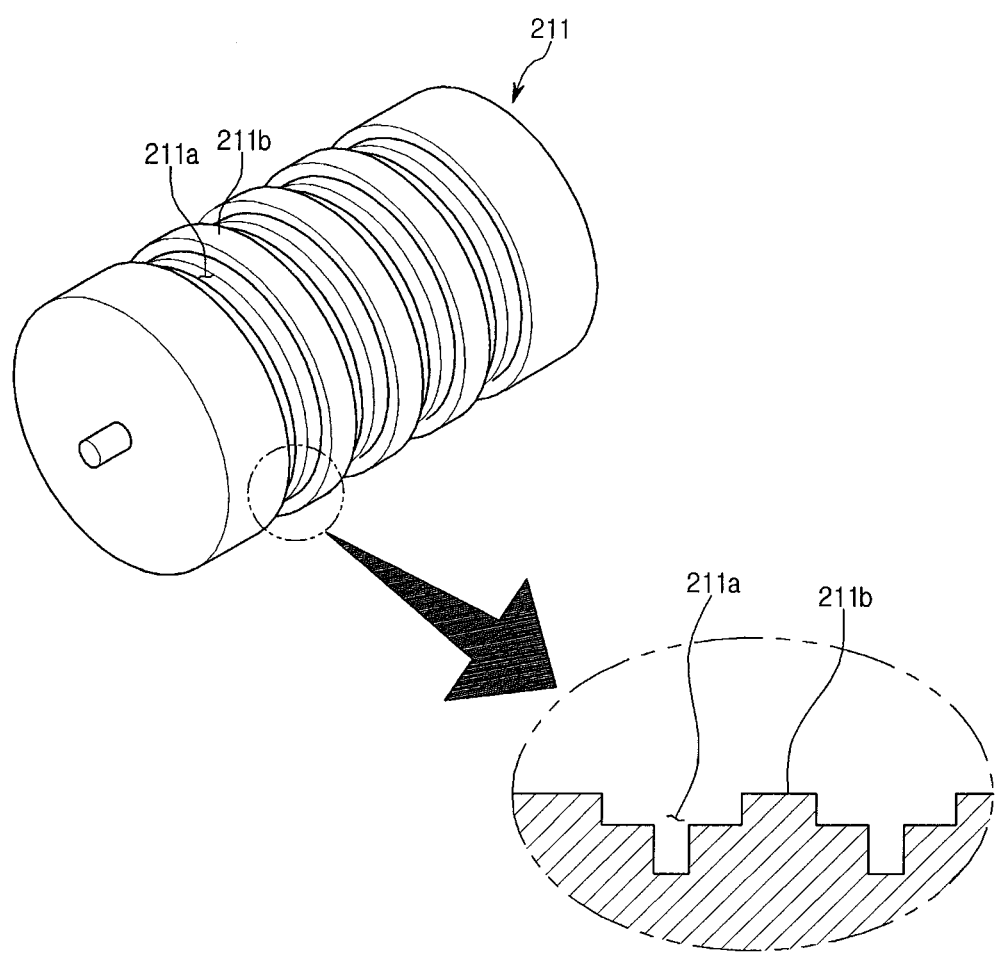
FIG. 16 is a perspective view of a first roller of FIG. 15.
Figure 17:
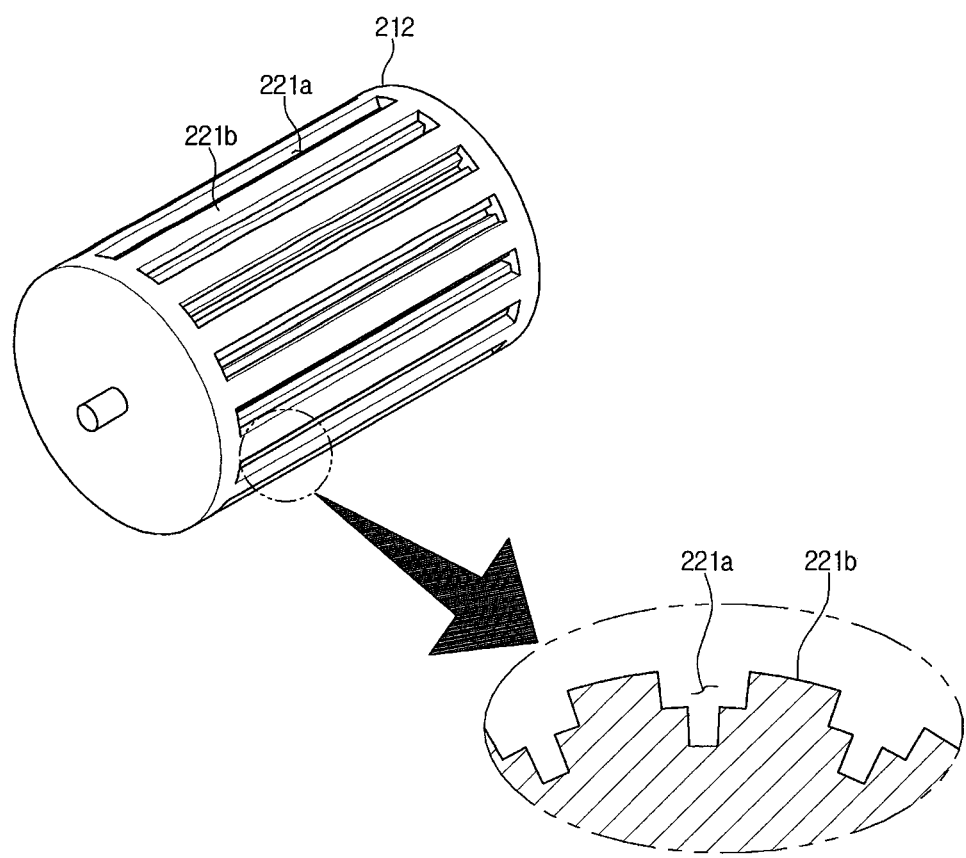
FIG. 17 is a perspective view of a third roller of FIG. 15.

FIG. 15 illustrates an apparatus 200 for manufacturing a structure colour of photonic crystals according to another embodiment of the present invention, and FIG. 16 is a perspective view of a first roller of FIG. 15, and FIG. 17 is a perspective view of a third roller of FIG. 15.

As illustrated in FIG. 15, the apparatus 200 for manufacturing the structure colour of photonic crystals according to the current embodiment of the present invention comprises a lateral basic element layer forming roller portion 210 and a longitudinal base element layer forming roller portion 220.

The lateral basic element layer forming roller portion 210 comprises first and second rollers 211 and 212, a photonic crystal cloning material first supplying portion 213, a first carrier film supplying unit 214, and a first carrier film winding portion 215.

The first roller 211 is rotated by a driving portion, and a plurality of basic unit body forming grooves 211a each having a radial, symmetrical cross-section are formed in sides of the first roller 211. The cross-section of each of the basic unit body forming grooves 211a is "T"-shaped, and a plurality of thin film connecting portion forming portions 211b are formed between the basic unit body forming grooves 211a.

The second roller 212 is formed at one side of the first roller 211. The second roller 212 has a flat surface shape and is parallel to one side of the first roller 211, and a photocurable device 216 which cures a photonic crystal cloning material passing between the first and second rollers 211 and 212, is installed in the second roller 212.

The photonic crystal cloning material first supplying portion 213 which supplies the photonic crystal cloning material between the first roller 211 and the second roller 212, is formed above the first and second rollers 211 and 212.

Meanwhile, the first carrier film supplying portion 214 which supplies a carrier film 217 between the first and second rollers 211 and 212, is formed above the lateral basic element layer forming roller portion 210.

The carrier film 217 that is supplied by the first carrier film supplying portion 214, is formed at one side of the photonic crystal cloning material passing the first and second rollers 211 and 212 so that the photonic crystal cloning material can be stably conveyed.

Meanwhile, the longitudinal basic element layer forming roller portion 220 is formed at one side of the lateral base element layer forming roller portion 210.

The longitudinal basic element layer forming roller portion 210 comprises a third roller 221, a fourth roller 222, a photonic crystal cloning material second supplying portion 223, a second carrier film supplying portion 224, and a second carrier film winding portion 225.

The third roller 221 is positioned above the photonic crystal cloning material (basic element layer) that is formed by the lateral basic element layer forming roller portion 210, and a plurality of basic unit body forming grooves 221a each having a lengthwise, symmetrical shape are formed in sides of the third roller 221, and a plurality of thin film connecting portion forming portions 221b are formed between the basic unit body forming grooves 221a.

Each of the basic unit body forming grooves 221a has a "T"-shaped cross-section.

The fourth roller 222 is positioned at one side of the third roller 221 in a line with the third roller 221, and a photocurable device 226 is installed in the fourth roller 222. The photocurable device 226 cures the photonic crystal cloning material passing between the third and fourth rollers 221 and 222.

The photonic crystal cloning material second supplying portion 223 which supplies the photonic crystal cloning material between the third roller 221 and the fourth roller 222, is installed above the third and fourth rollers 221 and 222.

In addition, the second carrier film supplying portion 224 which supplies the carrier film 217 between the third roller 221 and the fourth roller 222, is formed above the third and fourth rollers 221 and 222, and the second carrier film winding portion 225 which winds and stores the carrier film 217 passing between the third and fourth rollers 221 and 222, is formed below the third and fourth rollers 221 and 222.

The carrier film 217 that is supplied by the second carrier film supplying portion 224 allows the photonic crystal cloning material to pass between the third and fourth rollers 221 and 222 and to be deposited on the photonic crystal cloning material passing between the first and second rollers 211 and 212.

When the photonic crystal cloning material passing between the third and fourth rollers 221 and 222 is consecutively deposited on the photonic crystal cloning material passing between the first and second rollers 211 and 212, a two-layered photonic crystal cloning material is formed. When one of the lateral basic element layer forming roller portion 210 and one of the longitudinal basic element layer forming roller 220 are sequentially added to the apparatus 200 for manufacturing the structure colour of photonic crystals of FIG. 15, a four-layered photonic crystal cloning material is formed so that the same photonic crystal cloning structure as FIG. 15 can be consecutively manufactured.

Figure 18:
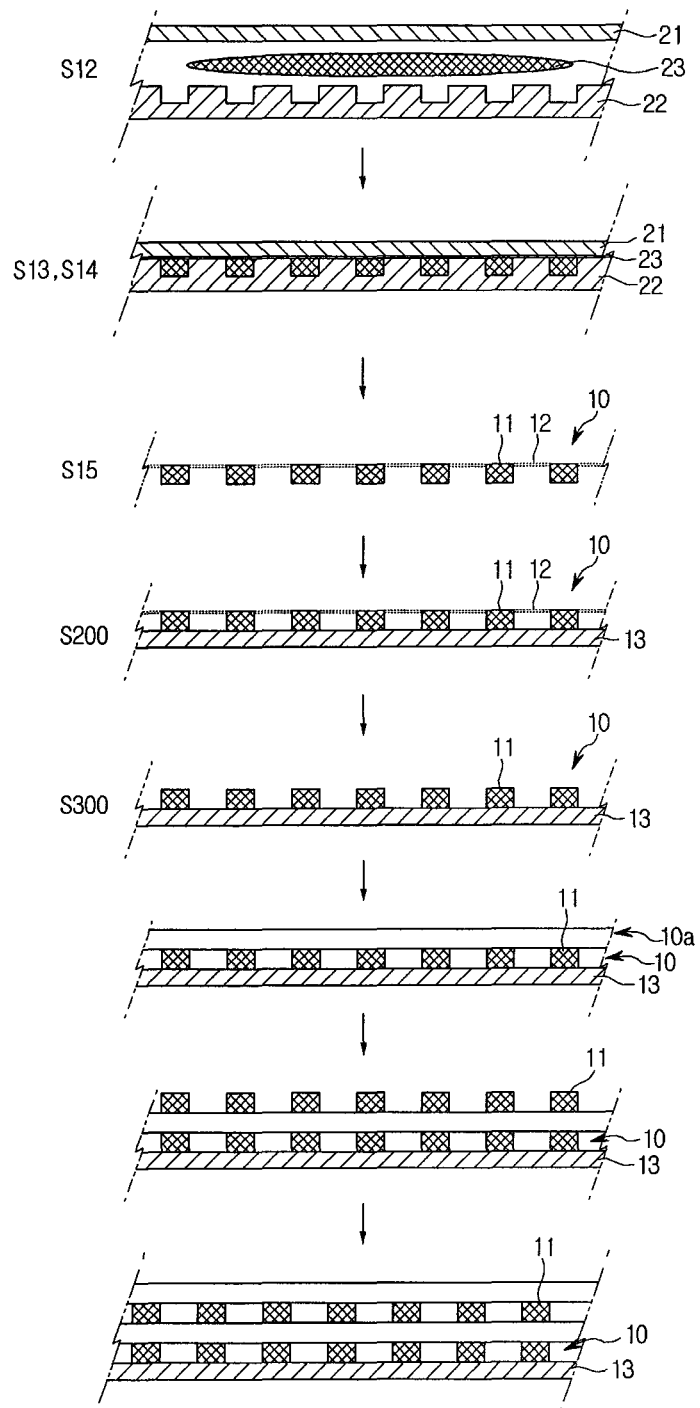
FIG. 18 is a cross-sectional view of each operations of a method of manufacturing a structure colour of photonic crystals according to another embodiment of the present invention.
Figure 19:
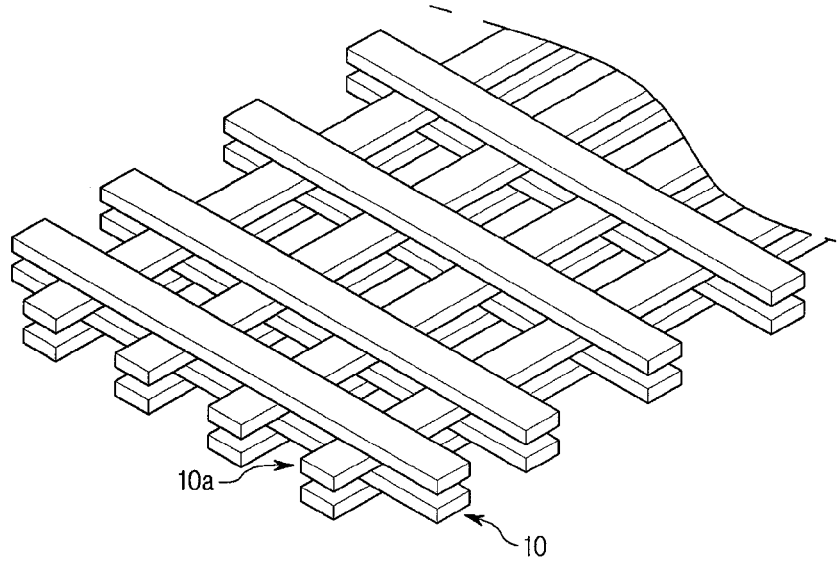
FIG. 19 is a perspective view of the structure colour of photonic crystals which is manufactured by the method of FIG. 18 and in which basic element layers are stacked perpendicular thereto.

FIG. 18 is a cross-sectional view of each of operations of a method of manufacturing a structure colour of photonic crystals according to another embodiment of the present invention, and FIG. 19 is a perspective view of the structure colour of photonic crystals which is manufactured by the method of FIG. 18 and in which basic element layers are stacked perpendicular thereto.

As illustrated in FIG. 18, each of basic element layers 10 of the structure colour of photonic crystals according to the current embodiment of the present invention has a rectangular cross-section.

The method of manufacturing the structure colour of photonic crystals of FIG. 18 comprises forming the basic element layers 10 (S100), stacking the basic element layers 10 (S200), removing thin film connecting portions (S300), and determining whether the structure colour of photonic crystals is completed (S400).

The forming of the basic element layers 10 comprises forming the basic element layers 10 each comprising a plurality of basic unit bodies 11 and a plurality of thin film connecting portions 12.

The forming of the basic element layers 10 (S100) comprises: aligning lower and upper molds that are formed by intaglio engraving bottom and top surfaces of photonic crystals; inserting a photonic crystal cloning material between the lower and upper molds (S12); pressing the lower and upper molds to form the photonic crystal cloning material (S13); curing the photonic crystal cloning material (S14); and separating the lower mold and the upper mold from each other (S15).

The detailed description of each of the operations is the same as that of FIG. 3 and thus, a detailed description thereof will be omitted.

The prism-shaped basic element layers 10 each having a rectangular cross-section, as illustrated in FIG. 18, next basic element layers 10a cross the adjacent "T"-shaped basic element layers 10 perpendicular thereto. In the current embodiment, four layers are stacked.

In the method of manufacturing the structure colour of photonic crystals of FIG. 18 by which the next basic element layers 10a cross the adjacent basic element layers 10 perpendicular thereto, the photonic crystal cloning material is aligned by checking a colour and a pattern in which light having a predetermined wavelength is irradiated on the photonic crystal cloning material and the light is reflected during a stacking operation, or a process of correcting arrangement of the photonic crystal cloning material can be omitted after checking a colour and a pattern in which white light is irradiated on the photonic crystal cloning material at a predetermined angle and the white light is reflected, so that mass productivity is remarkably improved, compared to the method of manufacturing the structure colour of photonic crystals according to another embodiment of the present invention by which the next basic element layers 10a are stacked to be parallel to the adjacent basic element layers 10.

The structure colour of photonic crystals of FIG. 18 may be consecutively manufactured by replacing the first and third rollers of the apparatus for manufacturing the structure colour of photonic crystals of FIG. 15 with first and third rollers of FIGS. 20 and 21 that will be described later.

Figure 20:
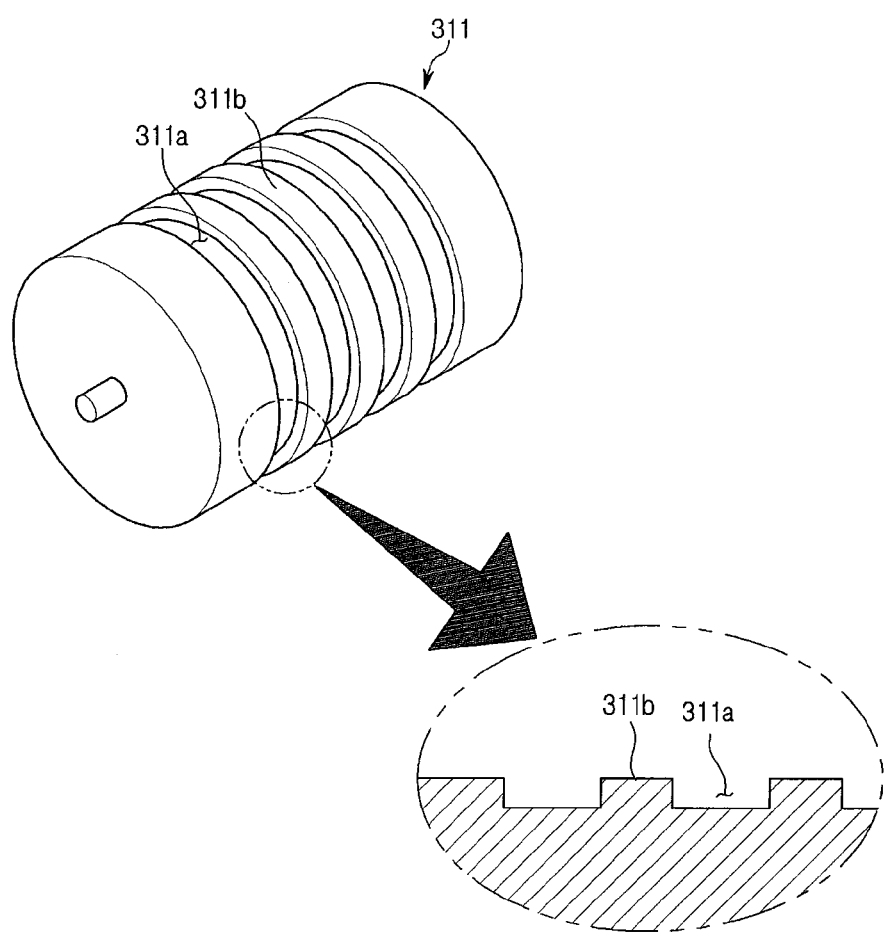
FIG. 20 is a perspective view of a first roller 311 that is used to manufacture the structure colour of photonic crystals of FIG. 18.
Figure 21:
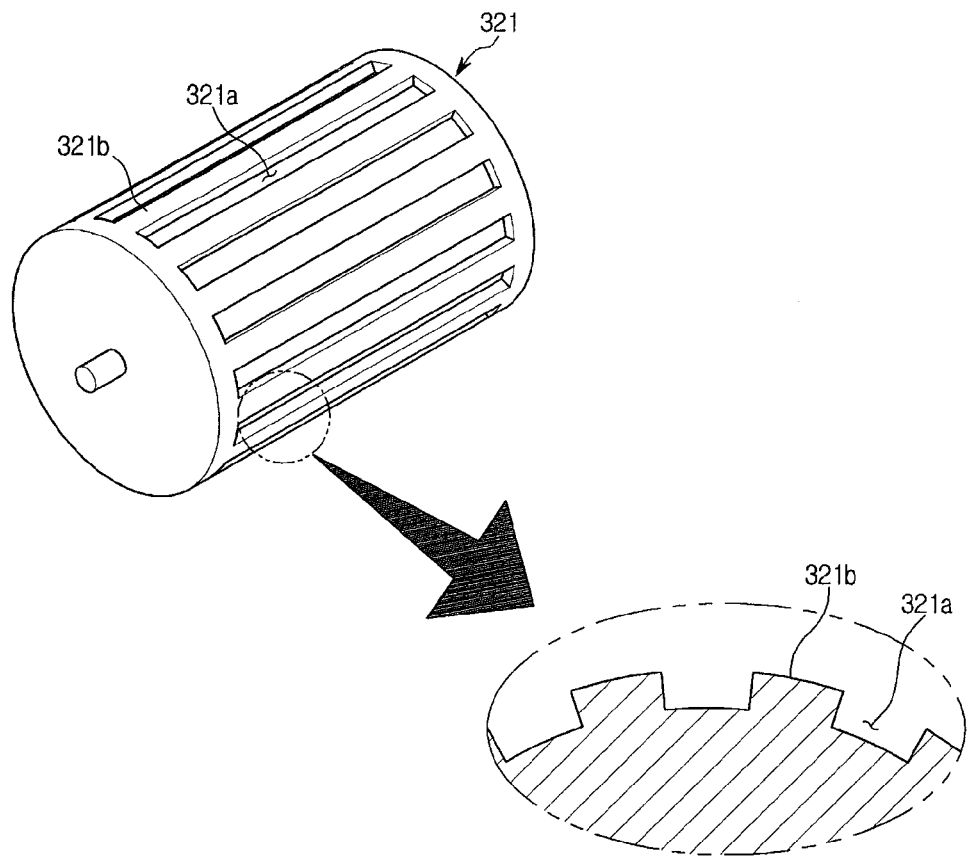
FIG. 21 is a perspective view of a third roller 321 that is used to manufacture the structure colour of photonic crystals of FIG. 18.

FIG. 20 is a perspective view of a first roller 311 that is used to manufacture the structure colour of photonic crystals of FIG. 18, and FIG. 21 is a perspective view of a third roller 321 that is used to manufacture the structure colour of photonic crystals of FIG. 18.

As illustrated in FIGS. 20 and 21, the first roller 311 is mounted to be rotated, and a plurality of basic unit body forming grooves 311a each having a radial, symmetrical cross-section are formed in sides of the first roller 311. A cross-section of each of the basic unit body forming grooves 311a is rectangular, and a plurality of thin film connecting portion forming portions 311b are formed between the basic unit body forming grooves 311a.

The third roller 321 is positioned above a photonic crystal cloning material (basic element layer) that is formed by the lateral basic element layer forming roller portion 210, and a plurality of basic unit body forming grooves 321a each having a lengthwise, symmetrical shape are formed in sides of the third roller 321, and a plurality of thin film connecting portion forming portions 321b are formed between the basic unit body forming grooves 321a.

Each of the basic unit body forming grooves 321a has a rectangular-shaped cross-section.

The other configuration of the first and third rollers that are used to manufacture the structure colour of photonic crystals of FIG. 18 and the apparatus of FIG. 18 are very similar to those of the apparatus for manufacturing the structure colour of photonic crystals of FIG. 15. Thus, a detailed description of the same configuration as the apparatus of FIG. 16 will be omitted.

Figure 22:
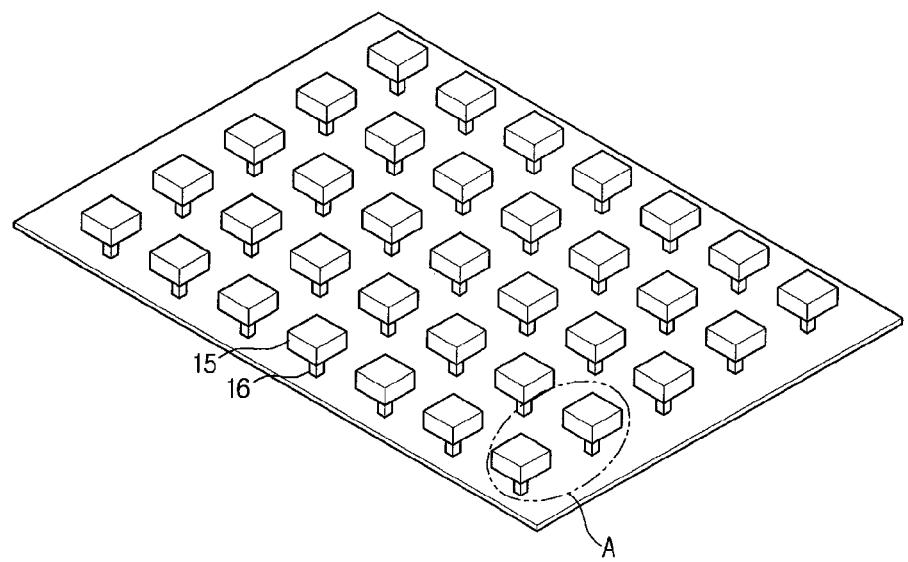
FIG. 22 is a perspective view of basic element layers 10 of a solid structure colour of photonic crystals according to another embodiment of the present invention.
Figure 23:
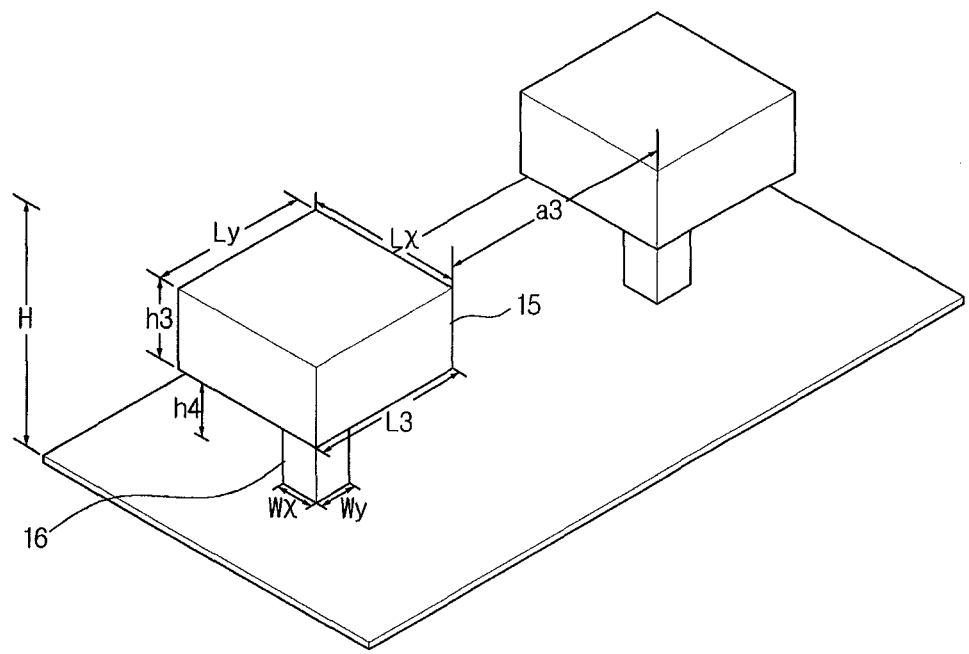
FIG. 23 is an enlarged view of a portion "A" of FIG. 22.
Figure 24:
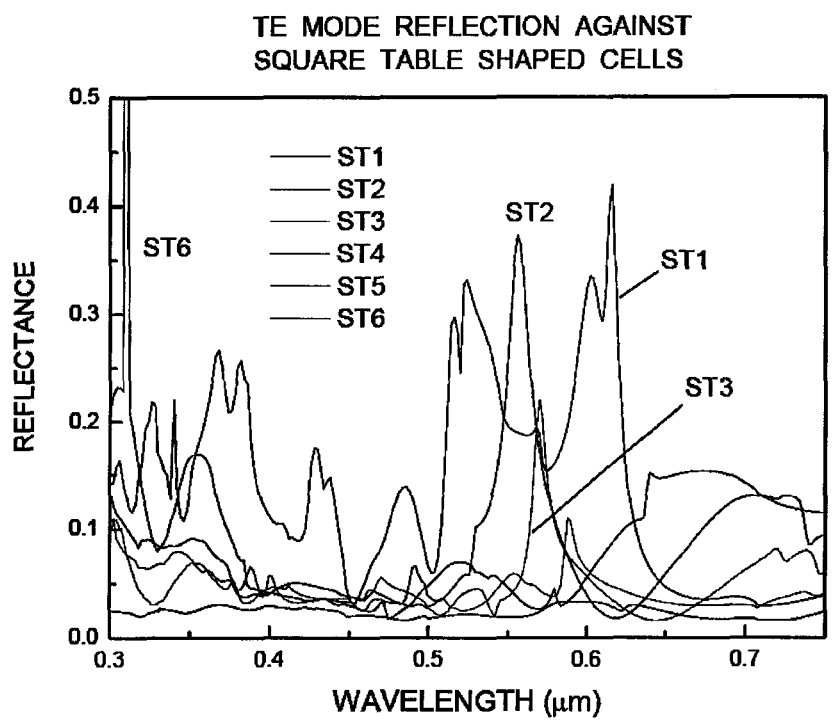
FIG. 24 is a graph showing wavelength (μm) versus reflectance and showing optical characteristic spectrum data of the structure colour of photonic crystals that is formed by the method of manufacturing the structure colour of photonic crystals illustrated in FIG. 18.

FIG. 22 is a perspective view of basic element layers 10 of a solid structure colour of photonic crystals according to another embodiment of the present invention, and FIG. 23 is an enlarged view of a portion "A" of FIG. 22, and FIG. 24 is a graph showing wavelength (μm) versus reflectance and showing optical characteristic spectrum data of the structure colour of photonic crystals that is formed by the method of manufacturing the structure colour of photonic crystals illustrated in FIG. 18.

As illustrated in FIG. 22, the basic element layers 10 according to the current embodiment of the present invention are formed by horizontally arranging a plurality of solid basic unit bodies 11 each comprising a hexahedral horizontal portion 15, and a vertical portion 16 that extends from a middle of an upper part of the horizontal portion 15 to a lower part thereof. A plurality of basic element layers 10 are stacked vertically and constitute the structure colour of photonic crystals.

Each of the horizontal portions 15 of the basic element layers 10 has a rectangular parallelepiped shape having a width Lx of 0.5~1.5 μm, a length Ly of 0.5~1.5 μm and a height h3 of 0.10~0.35 μm, and each of the vertical portions 16 has a rectangular column shape having a width Wx of 0.15~0.35 μm, a length Wy of 0.15~0.7 an and a height h4 of 0.8~1.2 μm, and a distance a3 between the basic unit bodies of the basic element layers 10 is 0.5-1.0 μm.

The structure colour of photonic crystals of FIG. 22 has a peak value of transmittance and reflectance at a predetermined wavelength according to sizes of basic element bodies and represents a predetermined colour, as will be described with reference to FIG. 24. Visible rays in all of frequency bands can be represented by changing the sizes of the basic element bodies by using the structure colour of photonic crystals of FIG. 22.

Specifications of ST1 to ST6 of FIG. 24 are shown in Table 1.

TABLE 1

|  | Lx, Ly | h3 | Wx | Wy |
|---|---|---|---|---|
| ST1 | 0.75 | 0.3 | 0.3 | 0.3 |
| ST2 | 0.6 | 0.15 | 0.2 | 0.2 |
| ST3 | 0.6 | 0.15 | 0.2 | 0.6 |
| ST4 | 0.6 | 0.15 | 0.6 | 0.2 |
| ST5 | 0.6 | 0.15 | 0.6 | 0.6 |
| ST6 | 0.6 | 0.15 | 0.2 | 0.6 |

Figure 25:
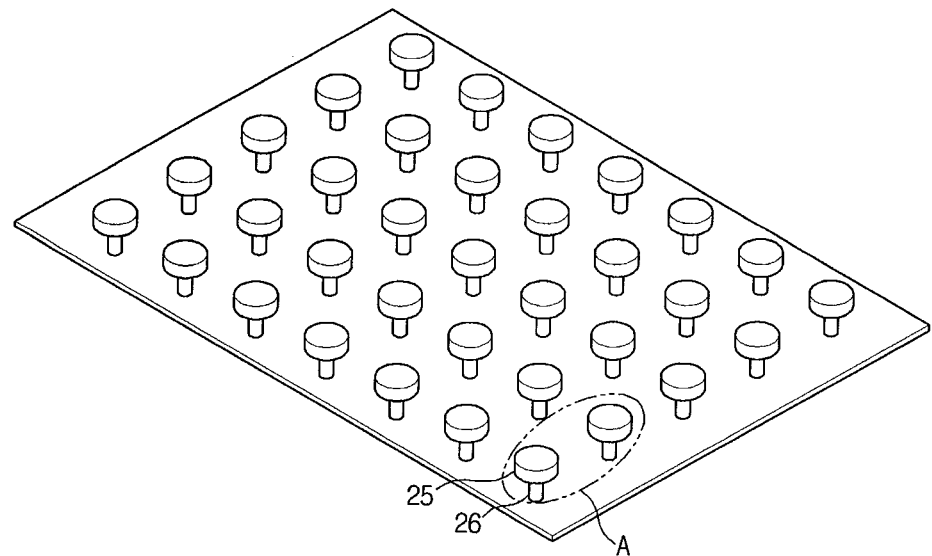
FIG. 25 is a perspective view of basic element layers of a structure colour of photonic crystals according to another embodiment of the present invention.
Figure 26:
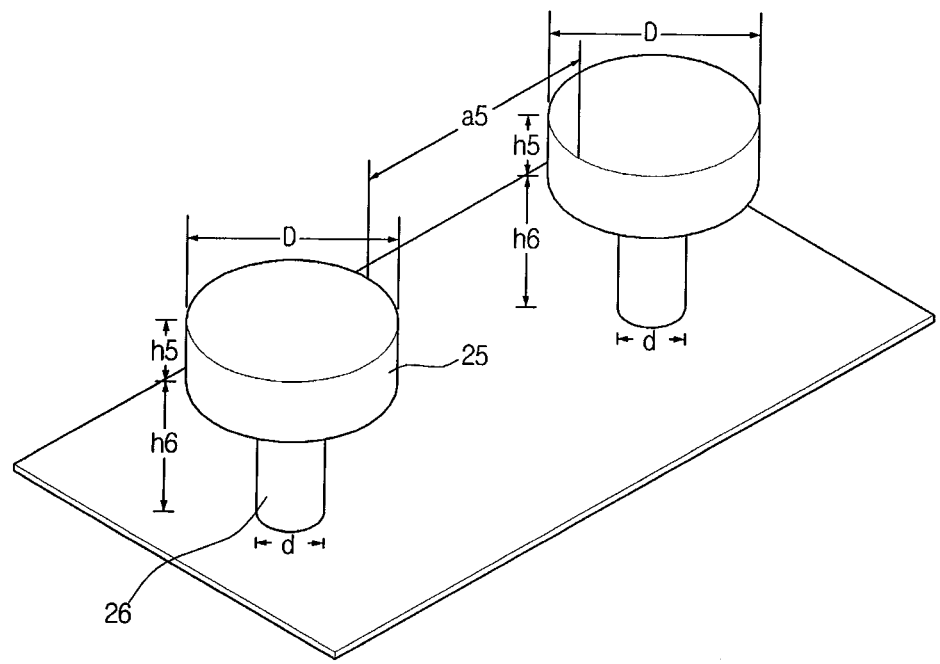
FIG. 26 is an enlarged view of a portion "A" of FIG. 25.

FIG. 25 is a perspective view of basic element layers of a structure colour of photonic crystals according to another embodiment of the present invention, and FIG. 26 is an enlarged view of a portion "A" of FIG. 25.

The current embodiment of FIG. 25 is modification of the shape of basic unit bodies. The basic element layers of FIG. 25 are formed by horizontally arranging a plurality of basic unit bodies each comprising a horizontal portion 25 and a vertical portion 26.

The horizontal portion 25 is circular plate shaped, and the vertical portion 26 extends form a middle to a lower part of the horizontal portion 25.

The horizontal portion 25 of each of the basic unit bodies has a circular plate shape having a diameter D of 0.5~1.5 μm and a height h5 of 0.10~0.35 μm. The vertical portion 26 thereof has a circular cylinder shape having a diameter d of 0.15~0.35 μm and a height h6 of 0.8~1.2 μm, and a distance a5 between the basic unit bodies of the basic element layers is 0.5~1.0 μm.

The basic unit bodies of FIG. 25 has an advantage that the horizontal portion 25 has the circular plate shape and the basic unit bodies can be easily processed during a nanoimprint process.

Figure 27:
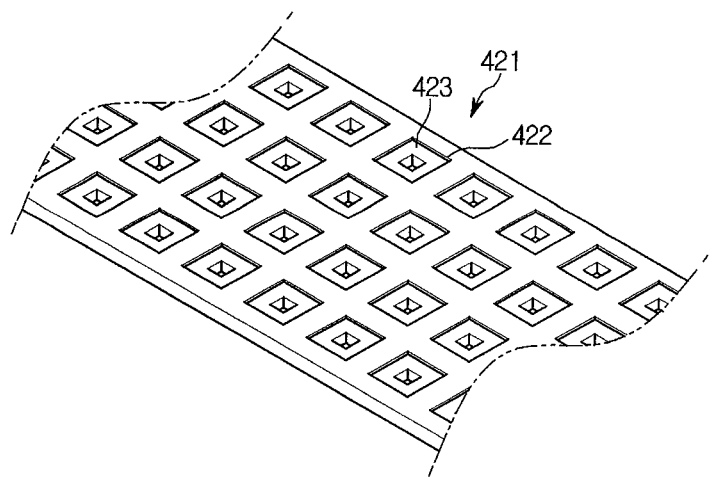
FIG. 27 is a perspective view of a flat mold that is used to manufacture the structure colour of photonic crystals of FIG. 25.
Figure 28:
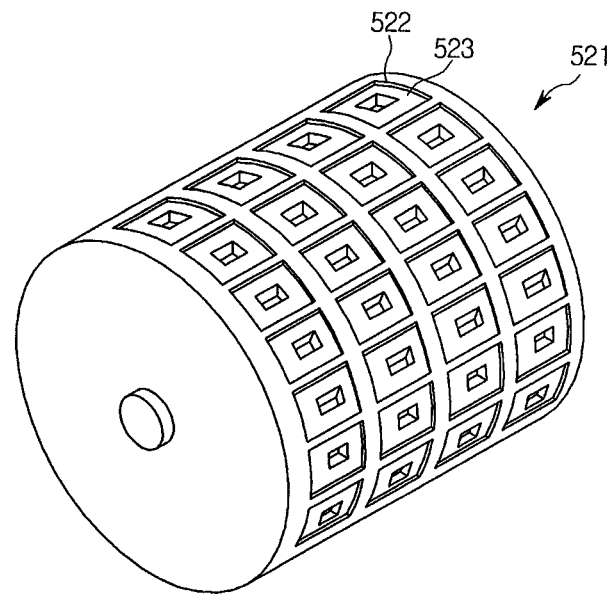
FIG. 28 is a perspective view of a mold having a roller shape that is used to manufacture the structure colour of photonic crystals of FIG. 25.

FIGS. 27 and 28 are perspective views of molds that are used to manufacture the structure colour of photonic crystals of FIG. 22.

Basic element layers of the structure colour of photonic crystals may be formed by forming molds illustrated in FIGS. 27 and 28.

FIG. 27 illustrates a flat mold 421, and FIG. 28 illustrates a forming roller mold 521 having a roller shape.

A plurality of grooves 422 are formed in one side of the flat mold 421 of FIG. 27. The plurality of grooves 422 are formed in such a way that a short protrusion 423 is formed at outer edges of the grooves 422 and each of the grooves 422 has a "T"-shaped cross-section.

The forming roller mold 521 having the roller shape of FIG. 28 is formed in a cylindrical shape. A plurality of forming grooves 522 are formed in their cylindrical outer circumferences. The plurality of forming grooves 522 are formed in such a way that a short protrusion 523 is formed in the outer edges of the forming grooves 522 and each of the grooves 522 has a "T"-shaped cross-section.

The solid basic element layers 10 of FIG. 22 are formed by using the forming molds of FIGS. 27 and 28. A detailed forming process thereof is the same as that of FIG. 3 described above.

The solid basic element layers of FIG. 25 may be formed by changing the shapes of the forming grooves of the forming molds of FIGS. 27 and 28.

Figure 29:
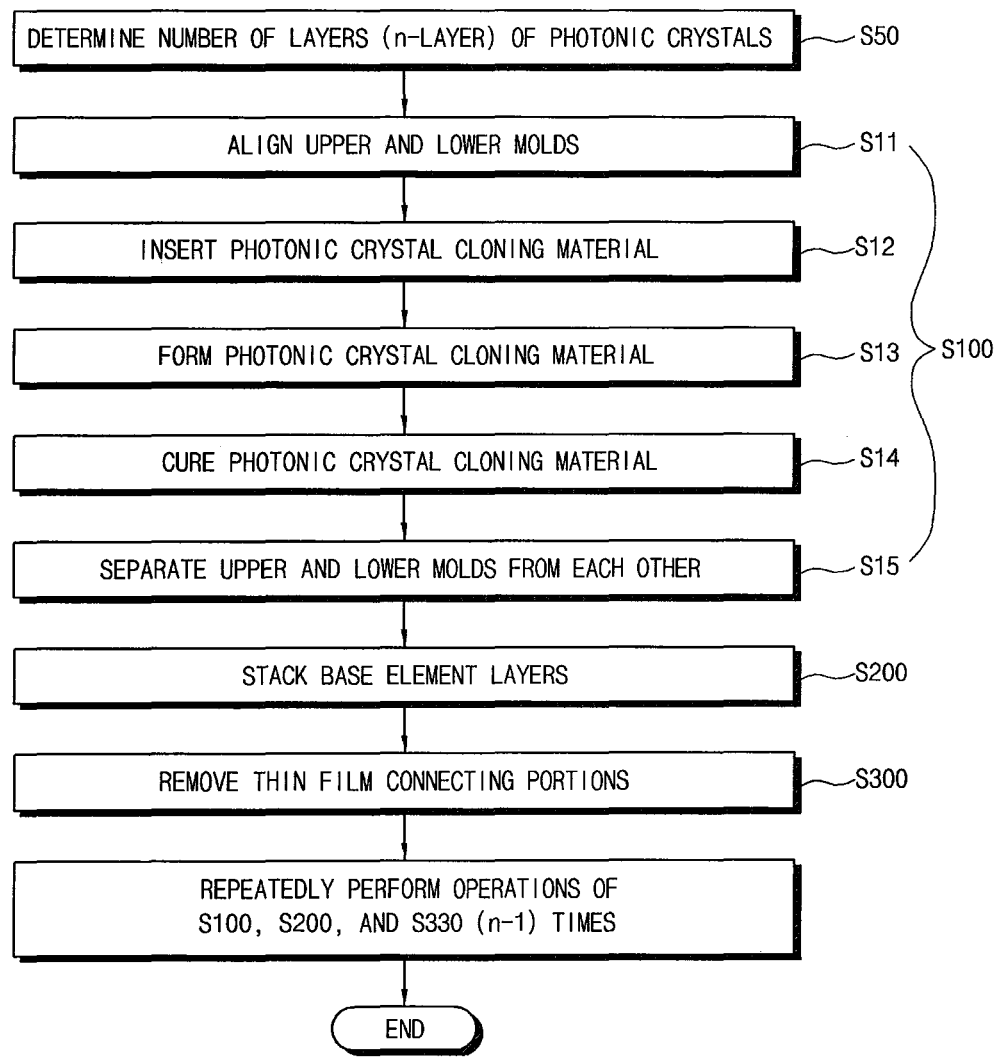
FIG. 29 is a flowchart illustrating a method of manufacturing a structure colour of photonic crystals according to another embodiment of the present invention.

FIG. 29 is a flowchart illustrating a method of manufacturing a structure colour of photonic crystals according to another embodiment of the present invention.

Referring to FIG. 29, the method of manufacturing the structure colour of photonic crystals according to the current embodiment of the present invention comprises designing and determining the number of layers (n-layer) of a structure colour of photonic crystals (S50); forming basic element layers by using a nanoimprinting method, the basic element layers comprising a plurality of basic unit bodies each having a symmetrical cross-section and a plurality of thin film connecting portions connecting the basic unit bodies one another (S100); sequentially stacking the basic element layers (S200); and removing the thin film connecting portions by etching (S300). The structure colour of photonic crystals is formed by repeatedly performing the forming of the basic element layers (S100), the stacking of the basic element layers (S200), and the removing of the thin film connecting portions (n−1) times (S300).

In the current embodiment of FIG. 29, the number of repetition (n times) is pre-set, unlike in the embodiment of FIG. 3. In addition, the forming of the basic element layers (S100), the stacking of the basic element layers (S200), and the removing of the thin film connecting portions (S300) are simply performed according to the number of repetition.

As a result, the current embodiment of FIG. 29 has an advantage that an additional operation such as determining whether a structure colour of photonic crystals is completed is omitted such that production processes and an apparatus thereof are simplified and a process time can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of manufacturing a structure colour of photonic crystals, the method comprising:
    forming a plurality of basic element layers by using nanoimprinting, the plurality of basic element layers comprising a plurality of basic unit bodies each having a symmetrical cross-section and thin film connecting portions connecting the basic unit bodies;
    sequentially stacking the basic element layers;
    removing the thin film connecting portions by using etching; and
    determining whether the structure colour of photonic crystals is completed,
    wherein, when it is determined that the structure colour of photonic crystals is not completed, the forming of the basic element layers, the stacking of the basic element layers, and the removing of the thin film connecting portions are repeatedly performed.

2. The method of claim 1, wherein the forming of the basic element layers comprises:
    aligning lower and upper molds that are formed by intaglio engraving bottom and top surfaces of photonic crystals;
    inserting a photonic crystal cloning material between the lower and upper molds;
    pressing the lower and upper molds to form the photonic crystal cloning material;
    curing the photonic crystal cloning material; and
    separating the lower and upper molds from each other.

3. The method of claim 1, wherein each of the basic unit bodies has a "T"-shaped cross-section.

4. The method of claim 1, wherein the forming of the basic element layers comprises:
    aligning a first forming roller that is formed by intaglio engraving a first side surface of the photonic crystals and a second forming roller that is formed by intaglio engraving a second side surface of the photonic crystals, in a line;
    passing a photonic crystal cloning material between the first forming roller and the second forming roller to simultaneously form both sides of the photonic crystal cloning material; and
    curing the photonic crystal cloning material.

5. The method of claim 4, wherein an intaglio engraved shape of the first forming roller is different from an intaglio engraved shape of the second forming roller so that both sides of the photonic crystal cloning material have different cross-sections.

6. The method of claim 1, wherein the stacking of the basic element layers comprises stacking the formed basic element layers on a substrate and sequentially stacking another basic element layers on the basic element layers that are stacked on the substrate, in a multilayer structure.

7. The method of claim 6, wherein the stacking of the basic element layers comprises aligning adjacent basic element layers to cross one another and stacking the basic element layers.

8. The method of claim 6, wherein the stacking of the basic element layers comprises stacking the basic element layers by changing top and bottom surfaces of a portion of the basic element layers.

9. The method of claim 1, wherein the stacking of the basic element layers comprises arranging the photonic crystal cloning material by checking a colour and a pattern in which light having a predetermined wavelength is irradiated on the photonic crystal cloning material and the light is reflected, or arranging and stacking the photonic crystal cloning material after checking a colour and a pattern in which white light is irradiated on the photonic crystal cloning material at a predetermined angle and the white light is reflected.

10. The method of claim 7, wherein a portion of the basic element layers is formed of a different material having different refractive indexes according to layers.

11. The method of claim 6, wherein the stacking of the basic element layers comprises arranging adjacent basic element layers perpendicular thereto and sequentially stacking the basic element layers.

12. The method of claim 1, wherein the removing of the thin film connecting portions comprises removing the thin film connecting portions by using plasma etching.

13. A structure colour of photonic crystals in which a plurality of basic element layers that are formed by using nanoimprinting and are sequentially stacked, the plurality of basic element layers comprising a plurality of basic unit bodies each having a "T"-shaped cross-section, wherein the basic element layers are arranged and stacked such that a vertical center line of each basic unit body of a basic element is different from a vertical center line of each basic unit body of adjacent basic element layers.

14. The structure colour of photonic crystals of claim 13, wherein a height H of each of the "T"-shaped basic unit bodies is 0.5~1.5 μm, a width W thereof is 0.5~1.5 μm, and a height h1 of an upper portion of each of the "T"-shaped basic unit bodies is 0.1~0.5 μm, and a height h2 of a lower portion of each of the "T"-shaped basic unit bodies is 0.5~1.0 μm, and a width w1 of the upper portion is 0.5~1.0 μm, and a width w2 of the lower portion is 0.1~0.3 μm, and a distance 'a' between the basic unit bodies is (0.5~1.0)×w1, and W/H=0.75~1.25, h1/h2=0.5~0.8.

15. The structure colour of photonic crystals of claim 13, wherein the basic element layers are stacked by changing top and bottom surfaces of a portion of the basic element layers.

16. The structure colour of photonic crystals of claim 13, wherein the basic element layers are formed by horizontally arranging a plurality of solid basic unit bodies each comprising a hexahedral horizontal portion, and a vertical portion that extends from a middle of an upper part of the horizontal portion to a lower part thereof.

17. The structure colour of photonic crystals of claim 16, wherein each of the horizontal portions of the basic element layers has a rectangular parallelepiped shape having a width Lx of 0.5~1.5 μm, a length Ly of 0.5~1.5 μm and a height h3 of 0.10~0.35 μm, and each of the vertical portions has a rectangular column shape having a width Wx of 0.15~0.35 μm, a length Wy of 0.15~0.7 μm and a height h4 of 0.8~1.2 μm, and a distance a3 between the basic unit bodies of the basic element layers 10 is 0.5~1.0 μm.

18. The structure colour of photonic crystals of claim 13, wherein the basic element layers are formed by horizontally arranging a plurality of solid basic unit bodies each comprising a circular plate-shaped horizontal portion, and a vertical portion that extends from a middle to a lower part of the horizontal portion.

19. The structure colour of photonic crystals of claim 18, wherein the horizontal portion of each of the basic unit bodies has a circular plate shape having a diameter D of 0.5~1.5 μm and a height h5 of 0.10~0.35 μm, and the vertical portion thereof has a circular cylinder shape having a diameter d of 0.15~0.35 μm and a height h6 of 0.8~1.2 μm, and a distance a5 between the basic unit bodies of the basic element layers is 0.5~1.0 μm.

20. A method of manufacturing a structure colour of photonic crystals, the method comprising:
    designing and determining the number of layers (n-layer) of the structure colour of photonic crystals;
    forming a plurality of basic element layers by using nanoimprinting, the plurality of basic element layers comprising a plurality of basic unit bodies each having a symmetrical cross-section and thin film connecting portions connecting the basic unit bodies;
    sequentially stacking the basic element layers; and
    removing the thin film connecting portions by using etching,
    wherein the forming of the basic element layers, the stacking of the basic element layers, and the removing of the thin film connecting portions are repeatedly performed (n−1) times.

21. An apparatus for manufacturing a structure colour of photonic crystals, the apparatus comprising:
    a lateral basic element layer forming roller portion comprising a first roller having a plurality of radial, symmetrical grooves formed in sides of the first roller, the first roller rotated by a driving portion, a second roller that is positioned to be engaged in a line with the first roller, and a photonic crystal cloning material first supplying portion supplying a photonic crystal cloning material between the first roller and the second roller; and
    a longitudinal basic element layer forming roller portion comprising a third roller that is formed at one side of the lateral basic element layer forming roller portion and is positioned above the photonic crystal cloning material passing the lateral basic element layers and has a plurality of lengthwise, symmetrical grooves formed insides of the third roller, a fourth roller that is positioned to be engaged in a line with the third roller, and a photonic crystal cloning material second supplying portion supplying a photonic crystal cloning material between the third roller and the fourth roller,
    wherein the photonic crystal cloning material passing the longitudinal basic element layer forming roller portion is deposited on the photonic crystal cloning material passing the lateral basic element layer forming roller portion.

22. The apparatus of claim 21, wherein each of the grooves of the first roller has a "T"-shaped cross-section.

23. The apparatus of claim 22, wherein each of the grooves of the first roller has a rectangular cross-section.

24. The apparatus of claim 21, wherein the lateral basic element layer forming roller portion further comprises:
    a first carrier film supplying portion which is formed above the lateral basic element layer forming roller portion and supplies a carrier film between the first roller and the second roller; and
    a first carrier film winding portion which winds the carrier film passing between the first roller and the second roller and stores the carrier film, and
    the longitudinal basic element layer forming roller portion further comprises:
    a second carrier film supplying portion which is formed above the longitudinal basic element layer forming roller portion and supplies a carrier film between the third roller and the fourth roller; and
    a second carrier film winding portion which winds the carrier film passing between the third roller and the fourth roller and stores the carrier film.

25. The method of claim 8, wherein a portion of the basic element layers is formed of a different material having different refractive indexes according to layers.

* * * * *